United States Patent
Jin et al.

(10) Patent No.: US 10,595,050 B2
(45) Date of Patent: Mar. 17, 2020

(54) METHOD AND APPARATUS FOR POST-PROCESSING INTRA OR INTER PREDICTION BLOCK ON BASIS OF GRADIENT OF PIXEL

(71) Applicant: SAMSUNG ELECTRONICS CO., LTD., Suwon-si (KR)

(72) Inventors: Bo-ra Jin, Yongin-si (KR); Min-woo Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 15/777,029

(22) PCT Filed: Nov. 24, 2016

(86) PCT No.: PCT/KR2016/013610
§ 371 (c)(1),
(2) Date: May 17, 2018

(87) PCT Pub. No.: WO2017/091001
PCT Pub. Date: Jun. 1, 2017

(65) Prior Publication Data
US 2018/0332309 A1 Nov. 15, 2018

Related U.S. Application Data

(60) Provisional application No. 62/259,200, filed on Nov. 24, 2015.

(51) Int. Cl.
*H04N 19/85* (2014.01)
*H04N 19/176* (2014.01)
(Continued)

(52) U.S. Cl.
CPC ........... *H04N 19/85* (2014.11); *H04N 19/107* (2014.11); *H04N 19/117* (2014.11);
(Continued)

(58) Field of Classification Search
CPC .. H04N 19/107; H04N 19/117; H04N 19/124; H04N 19/14; H04N 19/176;
(Continued)

(56) References Cited

U.S. PATENT DOCUMENTS

| 7,899,115 B2 | 3/2011 | Jeon et al. |
| 8,548,052 B2 | 10/2013 | Alshina et al. |

(Continued)

FOREIGN PATENT DOCUMENTS

| KR | 10-2009-0039689 A | 4/2009 |
| KR | 10-2010-0000011 A | 1/2010 |

(Continued)

OTHER PUBLICATIONS

Communication dated Mar. 7, 2017 issued by the International Searching Authority in counterpart International Patent Application No. PCT/KR2016/013610 (PCT/ISA/210).

(Continued)

*Primary Examiner* — Francis Geroleo
(74) *Attorney, Agent, or Firm* — Sughrue Mion, PLLC

(57) ABSTRACT

Provided is an image encoding or decoding method and apparatus for post-processing an intra- or inter-predicted block based on pixel gradients. In the image decoding method and apparatus according to an embodiment, prediction mode information of a current block to be decoded and filtering information indicating whether to filter a predicted block are obtained from a bitstream, a first predicted block of the current block is generated based on the prediction mode information, a second predicted block is generated by changing a pixel value of a current pixel in the first predicted block based on gradient values between the current pixel and adjacent pixels of the current pixel, when the filtering information indicates to filter the first predicted block, a residual corresponding to a difference value between the (Continued)

current block and the second predicted block is reconstructed by extracting the residual from the bitstream, and the current block is decoded by adding the residual to the second predicted block.

14 Claims, 22 Drawing Sheets

(51) Int. Cl.
| | |
|---|---|
| *H04N 19/117* | (2014.01) |
| *H04N 19/46* | (2014.01) |
| *H04N 19/107* | (2014.01) |
| *H04N 19/124* | (2014.01) |
| *H04N 19/91* | (2014.01) |
| *H04N 19/44* | (2014.01) |
| *H04N 19/80* | (2014.01) |
| *H04N 19/14* | (2014.01) |
| *H04N 19/82* | (2014.01) |

(52) U.S. Cl.
CPC .......... *H04N 19/124* (2014.11); *H04N 19/14* (2014.11); *H04N 19/176* (2014.11); *H04N 19/44* (2014.11); *H04N 19/46* (2014.11); *H04N 19/80* (2014.11); *H04N 19/82* (2014.11); *H04N 19/91* (2014.11)

(58) Field of Classification Search
CPC ........ H04N 19/44; H04N 19/46; H04N 19/80; H04N 19/82; H04N 19/85; H04N 19/91
See application file for complete search history.

(56) References Cited

U.S. PATENT DOCUMENTS

| | | |
|---|---|---|
| 9,363,532 B2 | 6/2016 | Kim et al. |
| 9,402,079 B2 | 7/2016 | Alshina et al. |
| 2011/0135000 A1* | 6/2011 | Alshina ................ H04N 19/105 375/240.13 |
| 2013/0003832 A1* | 1/2013 | Li ........................ H04N 19/105 375/240.12 |
| 2015/0288980 A1 | 10/2015 | Lee et al. |
| 2018/0054620 A1 | 2/2018 | Kwon et al. |

FOREIGN PATENT DOCUMENTS

| | | |
|---|---|---|
| KR | 10-2010-0004037 A | 1/2010 |
| KR | 10-2015-0043278 A | 4/2015 |
| KR | 10-2015-0091287 A | 8/2015 |

OTHER PUBLICATIONS

Communication dated Mar. 7, 2017 issued by the International Searching Authority in counterpart International Patent Application No. PCT/KR2016/013610 (PCT/ISA/237).

* cited by examiner

FIG. 11
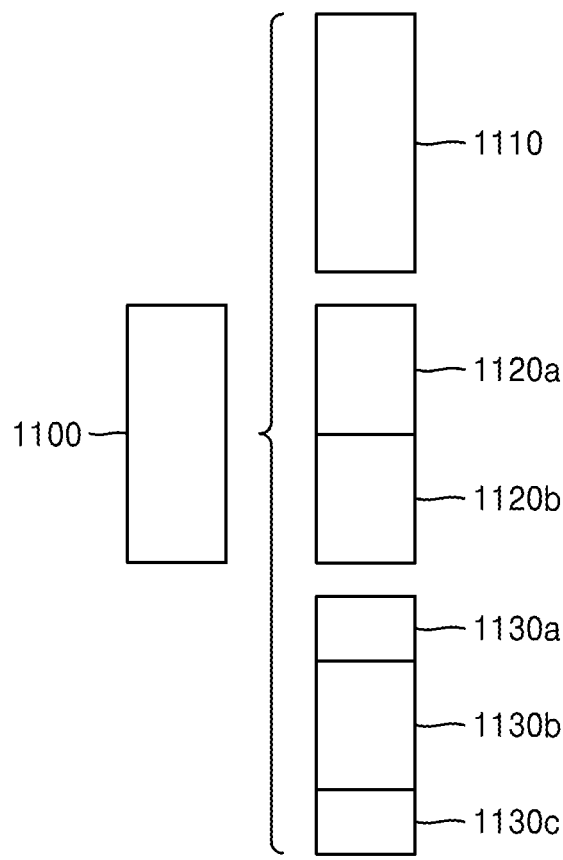
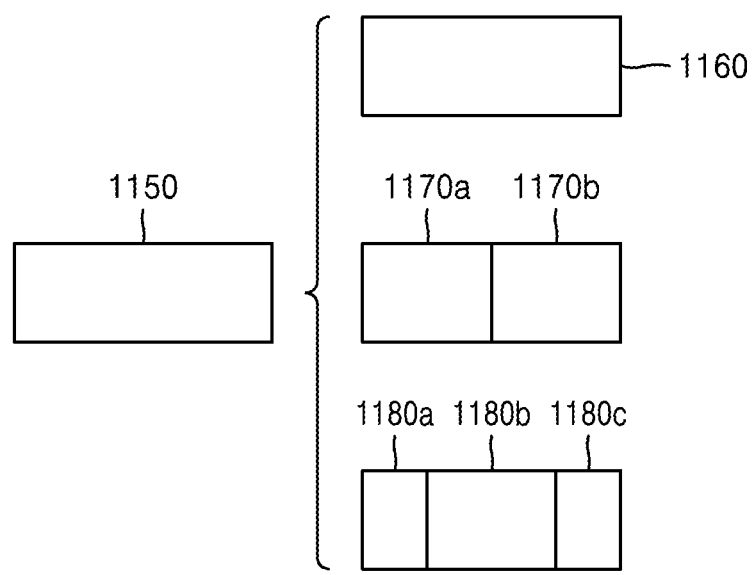

FIG. 20

| BLOCK SHAPE DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD AND APPARATUS FOR POST-PROCESSING INTRA OR INTER PREDICTION BLOCK ON BASIS OF GRADIENT OF PIXEL

TECHNICAL FIELD

The present disclosure relates to image encoding and decoding methods and apparatuses for increasing image compression efficiency by post-processing an intra- or inter-predicted block based on pixel gradients.

BACKGROUND ART

According to general image compression standards, image data is compressed by partitioning a frame into a plurality of block units, performing prediction on each block unit to obtain a predicted block, and transforming and quantizing a difference between the original image block and the predicted block.

A prediction method includes intra prediction and inter prediction. According to intra prediction, a current block is predicted using data of adjacent blocks in a current frame. According to inter prediction, a predicted block corresponding to a current block is generated from one or more previously encoded reference frames by using block-based motion compensation. Each block is encoded by encoding the block in all coding modes usable for intra prediction and inter prediction, and then determining an optimal coding mode based on a bitrate required to encode the block, and a distortion between an original block and a decoded block.

DESCRIPTION OF EMBODIMENTS

Technical Problem

Provided are image encoding and decoding methods and apparatuses for increasing image compression efficiency by post-processing an intra- or inter-predicted block based on pixel gradients.

Solution to Problem

According to an aspect of the present disclosure, an image decoding method includes obtaining, from a bitstream, prediction mode information of a current block to be decoded and filtering information indicating whether to filter a predicted block, generating a first predicted block of the current block based on the prediction mode information, generating a second predicted block by changing a pixel value of a current pixel in the first predicted block based on gradient values between the current pixel and adjacent pixels of the current pixel, when the filtering information indicates to filter the first predicted block, reconstructing a residual corresponding to a difference value between the current block and the second predicted block by extracting the residual from the bitstream, and decoding the current block by adding the residual to the second predicted block.

The generating of the first predicted block may include generating the first predicted block by performing intra prediction or inter prediction on the current block.

The generating of the second predicted block may include changing a pixel value of a next pixel adjacent to the current pixel, after changing the pixel value of the current pixel, and the pixel value of the next pixel may be changed based on gradient values between the next pixel and adjacent pixels of the next pixel.

The generating of the second predicted block may include determining weights of the current pixel, an upper pixel located at an upper side of the current pixel, and a left pixel located at a left side of the current pixel, based on a first gradient value indicating a difference value between the current pixel and the upper pixel and a second gradient value indicating a difference value between the current pixel and the left pixel, and changing the pixel value of the current pixel by using the weight of the current pixel, the weight of the upper pixel, and the weight of the left pixel.

When the first predicted block is generated using the intra prediction, the weights of the current pixel, the upper pixel, and the left pixel may be determined based on a direction of the intra prediction.

The generating of the second predicted block may further include determining weights of the current pixel, the upper pixel, the left pixel, a right pixel located at a right side of the current pixel, and a lower pixel located at a lower side of the current pixel, based on the first gradient value, the second gradient value, a third gradient value indicating a difference value between the current pixel and the right pixel, and a fourth gradient value indicating a difference value between the current pixel and the lower pixel, and the pixel value of the current pixel may be changed based on the weight of the current pixel, the weight of the upper pixel, the weight of the left pixel, the weight of the right pixel, and the weight of the lower pixel.

The generating of the second predicted block may include, assuming that a size of the first predicted block is m×n (where m and n are positive integers), the pixel value of the current pixel located in an $i^{th}$ column and a $j^{th}$ row of the first predicted block is f[i][j], the weight of the current pixel is α, the pixel value of the upper pixel is f[i][j−1], the weight of the upper pixel is β, the pixel value of the left pixel is f[i−1][j], the weight of the left pixel is γ, the pixel value of the right pixel is f[i+1][j], the weight of the right pixel is δ, the pixel value of the lower pixel is f[i][j+1], and the weight of the lower pixel is ε, changing the pixel value of the current pixel into f′[i][j] as shown in $$f'[i][j] = \frac{1}{\alpha + \beta + \gamma + \delta + \varepsilon}$$

$$(\alpha f[i][j] + \beta f[i][j-1] + \gamma f[i-1][j] + \delta f[i+1][j] + \varepsilon f[i][j+1]).$$

The weight δ of the right pixel may equal the weight γ of the left pixel, and the weight ε of the lower pixel may equal the weight β of the upper pixel.

The weight δ of the right pixel and the weight ε of the lower pixel may have a value 0.

The filtering information may include information about a number of times that filtering is repeated, and the generating of the second predicted block may be repeated by a predetermined number of times based on the information about the number of times that the filtering is repeated.

The generating of the second predicted block may include repeatedly changing pixel values of pixels in the second predicted block until a difference between pixel values of the current pixel before and after being changed converges to be equal to or less than a predetermined threshold value.

According to another aspect of the present disclosure, an image decoding apparatus includes an entropy decoder configured to obtain, from a bitstream, prediction mode information of a current block to be decoded and filtering information indicating whether to filter a predicted block, a predictor configured to generate a first predicted block of the current block based on the prediction mode information, a post-processor configured to generate a second predicted block by changing a pixel value of a current pixel in the first predicted block based on gradient values between the current pixel and adjacent pixels of the current pixel, when the filtering information indicates to filter the first predicted block, an inverse transformer and inverse quantizer configured to reconstruct a residual corresponding to a difference value between the current block and the second predicted block by extracting the residual from the bitstream, and an adder configured to decode the current block by adding the residual to the second predicted block.

The predictor may be further configured to generate the first predicted block by performing intra prediction or inter prediction on the current block.

The post-processor may be further configured to change a pixel value of a next pixel adjacent to the current pixel, after changing the pixel value of the current pixel, and the pixel value of the next pixel may be changed based on gradient values between the next pixel and adjacent pixels of the next pixel.

According to another aspect of the present disclosure, an image encoding method includes generating a first predicted block of a current block to be encoded, generating a second predicted block by changing a pixel value of a current pixel in the first predicted block based on gradient values between the current pixel and adjacent pixels of the current pixel, and encoding a difference value between the current block and the second predicted block.

BRIEF DESCRIPTION OF DRAWINGS

FIG. 11 illustrates an operation of determining one or more coding units by partitioning a non-square coding unit, according to an embodiment.

FIG. 20 illustrates an operation of determining a depth of a coding unit as the shape and size of the coding unit varies when a plurality of coding units are determined by recursively partitioning the coding unit, according to an embodiment.

MODE OF DISCLOSURE

Figure 1:
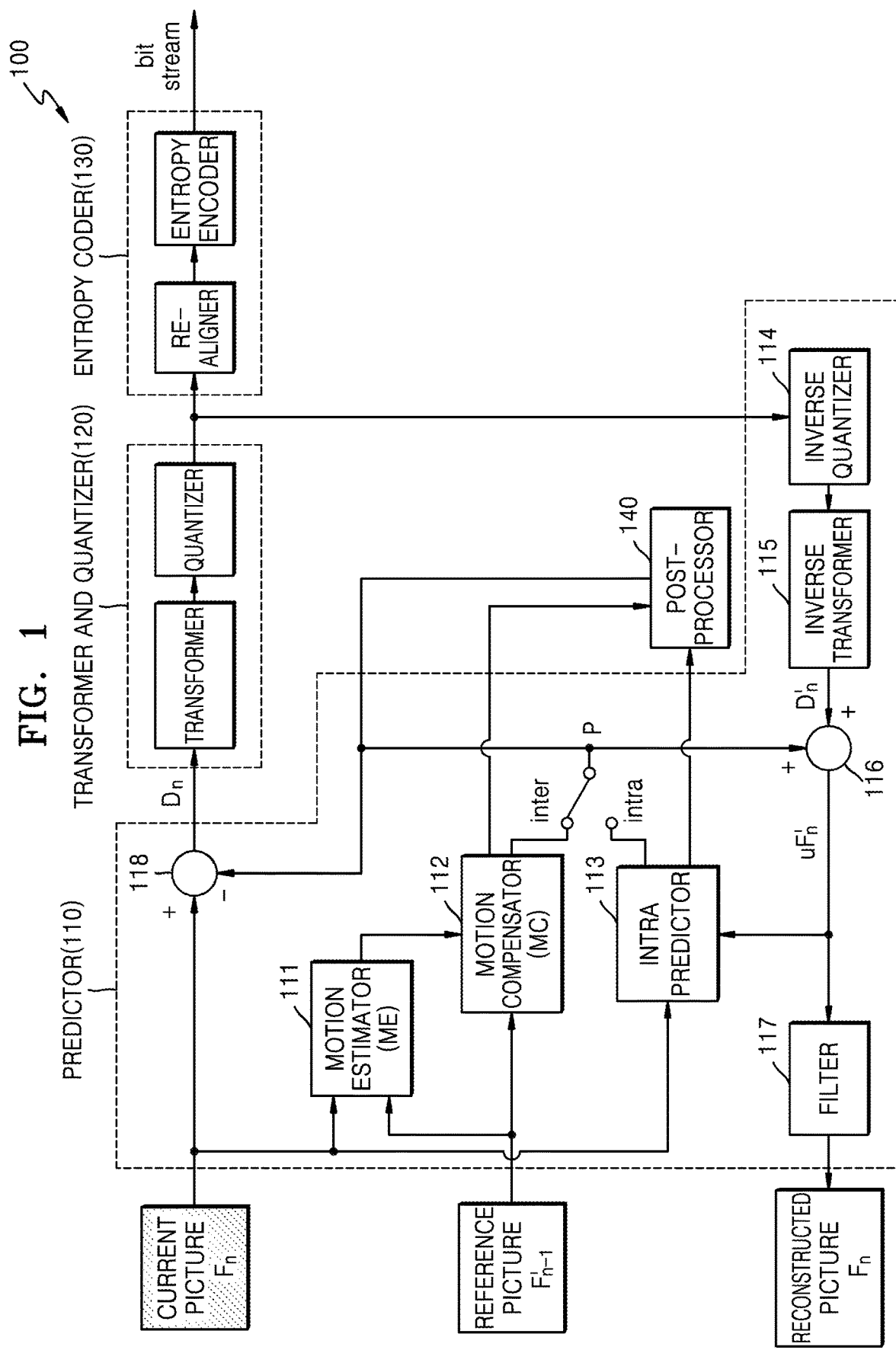
FIG. 1 is a block diagram showing a configuration of an image encoding apparatus according to an embodiment.

Hereinafter, the present disclosure will be described in detail by explaining embodiments of the disclosure with reference to the attached drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art.

Terminology used in this specification will now be briefly described before describing embodiments in detail.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Therefore, it should be noted that the terms used herein should be construed based on practical meanings thereof and the whole content of this specification, rather than being simply construed based on names of the terms.

As used herein, the singular forms "a", "an", and "the" are intended to include the plural forms as well, unless the context clearly indicates otherwise.

It will be understood that the terms "comprises", "comprising", "includes" and/or "including", when used herein, specify the presence of stated elements, but do not preclude the presence or addition of one or more other elements. The term "part" or "module" is used to denote an entity for performing at least one function or operation, and may be embodied as, but is not limited to, a software element or a hardware element such as a field-programmable gate array (FPGA) or an application-specific integrated circuit (ASIC). A "part" or "module" may be configured to exist in an addressable storage medium or to operate one or more processors. Thus, for example, the "part" or "module" includes elements (e.g., software elements, object-oriented software elements, class elements, and task elements), processes, functions, attributes, procedures, subroutines, segments of program code, drivers, firmware, micro-codes, circuits, data, database, data structures, tables, arrays, and parameters. Functions provided in elements and "parts" or "modules" may be combined to a smaller number of elements and "parts" or "modules" or may be divided into a larger number of elements and "parts" or "modules".

In the following description, the term "image" denotes a still image, e.g., a still frame of a video, or a moving image, e.g., a video itself.

The term "sample" denotes data assigned to a sampling location of an image, i.e., data to be processed. For example, pixel values of an image in the spatial domain, and transformation coefficients in the transformation domain may be samples. A unit including one or more samples may be defined as a block.

Reference will now be made in detail to embodiments, examples of which are illustrated in the accompanying drawings. In the following description, for clarity, parts or elements that are not related to the embodiments are omitted.

Image encoding and decoding apparatuses and image encoding and decoding methods according to embodiments will now be described with reference to FIGS. 1 to 23. Encoding and decoding methods and apparatuses for post-processing an intra- or inter-predicted block based on pixel gradients, according to embodiments, will be described with reference to FIGS. 1 to 9, and a method of determining a data unit of an image will be described with reference to FIGS. 10 to 23.

An encoding or decoding method and apparatus for post-processing an intra- or inter-predicted block based on pixel gradients, according to embodiments, will now be described with reference to FIGS. 1 to 9.

FIG. 1 is a block diagram showing a configuration of an image encoding apparatus 100 according to an embodiment.

To encode an image, the image encoding apparatus 100 according to an embodiment may partition image data of a current picture into largest coding units based on the largest size of coding units. Each largest coding unit may include coding units partitioned based on a block shape and a partitioning method. In the largest coding unit according to an embodiment, image data of the spatial domain, which is included in the largest coding unit, may be hierarchically partitioned based on a block shape and a partitioning method. A coding unit may have a square, rectangular, or arbitrarily geometric block shape and is not limited to a predetermined-sized data unit.

When the size of a picture to be encoded is large and larger coding units are used, a higher image compression ratio may be achieved. However, if large coding units are used and the size thereof is fixed, an image may not be efficiently encoded by reflecting continuously changing characteristics of the image.

For example, when a simple image of the sea or sky is encoded, large coding units may increase a compression ratio. However, when a complicated image of people or buildings is encoded, small coding units may increase a compression ratio.

In this regard, the image encoding apparatus 100 according to an embodiment sets different-sized largest coding units for different pictures or slices, and sets a block shape and a partitioning method of one or more coding units partitioned from the largest coding unit. The size of the coding units included in the largest coding unit may be variably set based on the block shape and the partitioning method.

The block shape and the partitioning method of the one or more coding units may be determined based on rate-distortion (R-D) cost calculation. The block shape and the partitioning method may be determined differently for pictures or slices, or be determined differently for largest coding units.

According to an embodiment, the coding units partitioned from the largest coding unit may be characterized in the block shape and the partitioning method. A method of determining the coding units based on the block shape and the partitioning method will be described in detail below with reference to FIGS. 10 to 23.

Referring to FIG. 1, the image encoding apparatus 100 according to an embodiment includes a predictor 110, a transformer and quantizer 120, an entropy coder 130, and a post-processor 140.

The predictor 110 performs inter prediction and intra prediction. Inter prediction refers to prediction of a current block by using a previously encoded, reconstructed, and stored reference picture. Inter prediction is performed by a motion estimator 111 and a motion compensator 112. Intra prediction refers to prediction of a current block by using pixels of a block adjacent to the block to be predicted. Intra prediction is performed by an intra predictor 113. Modes used for intra prediction representatively include a 4×4 intra prediction mode, an 8×8 intra prediction mode, and a 16×16 intra prediction mode.

Figure 2:
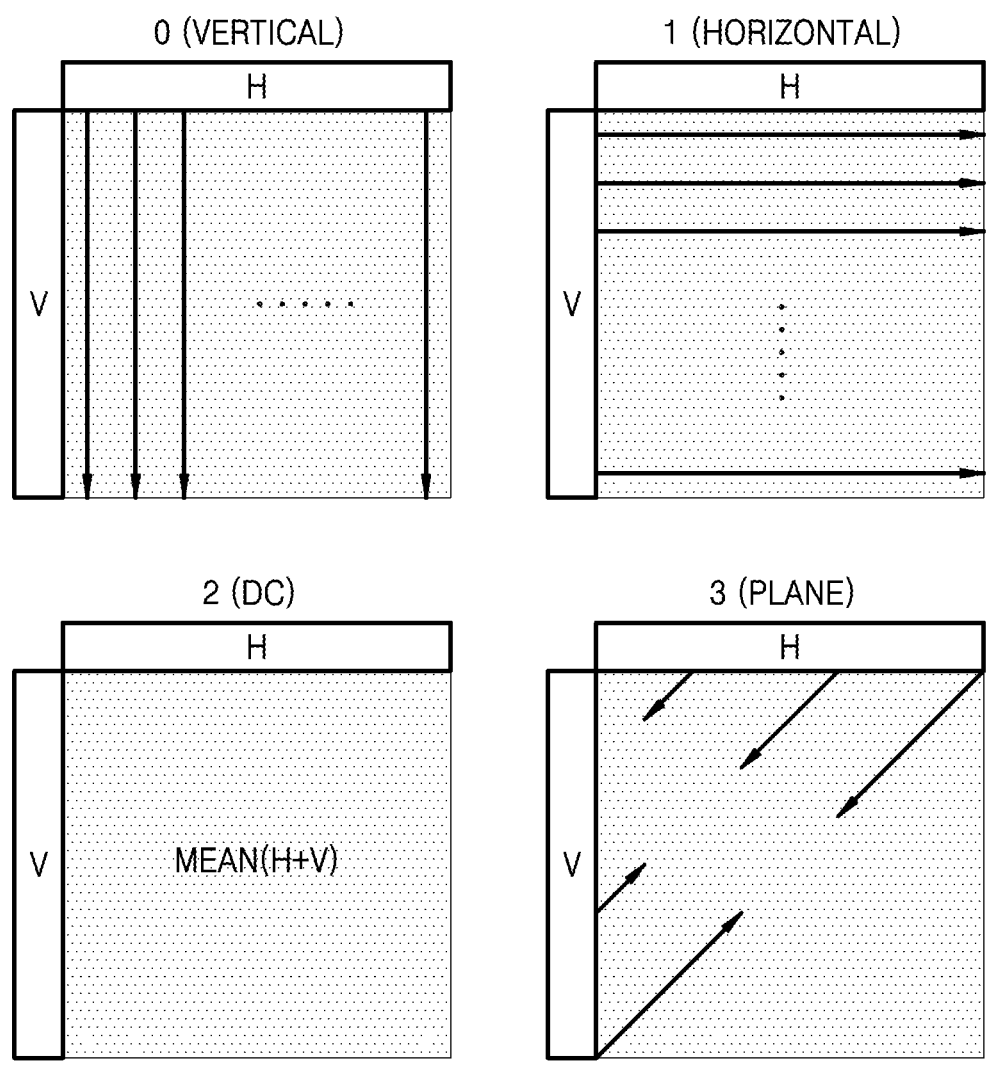
FIG. 2 is a diagram showing an example of a 16×16 intra prediction mode.
Figure 3:
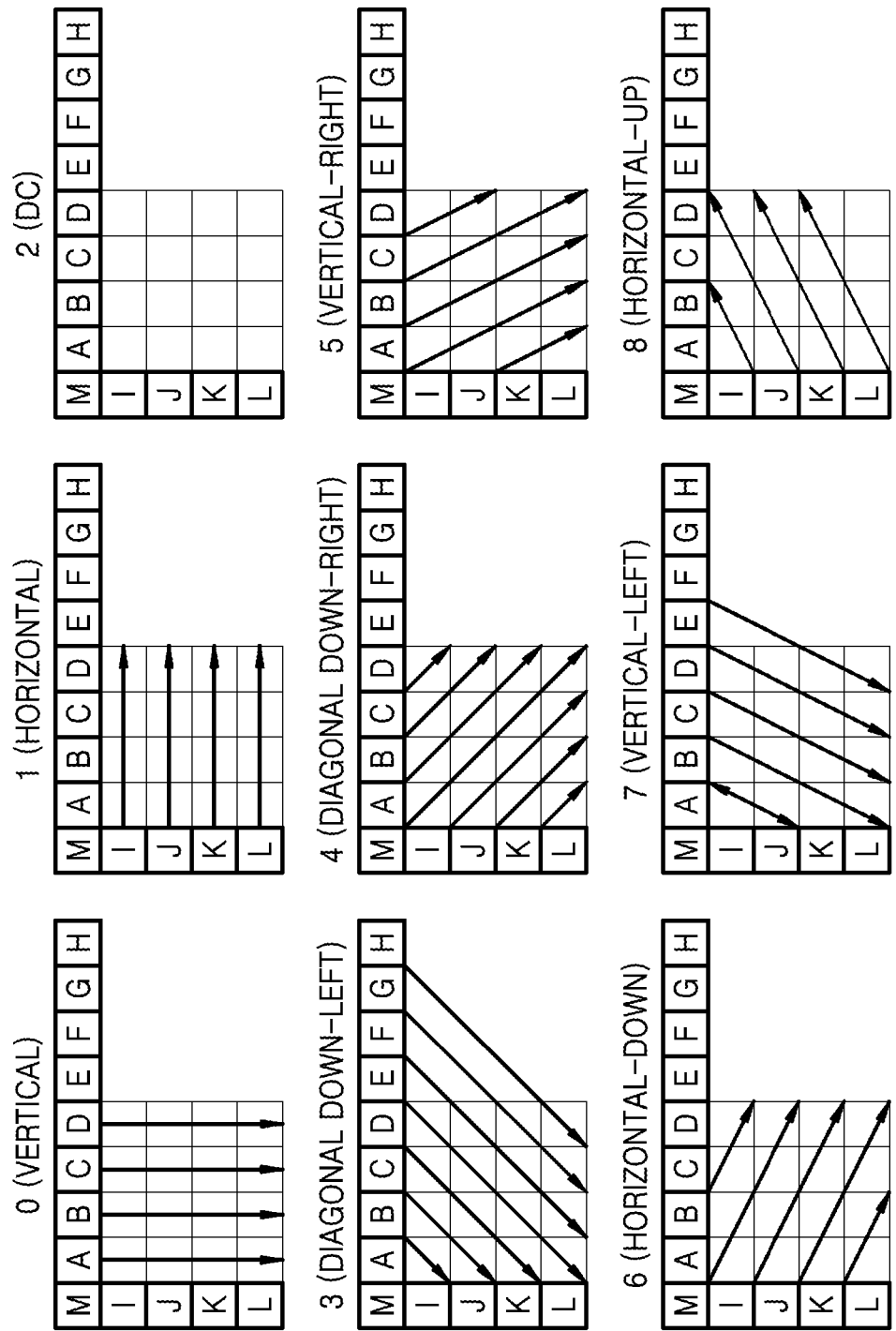
FIG. 3 is a diagram showing an example of a 4×4 intra prediction mode.

FIG. 2 is a diagram showing an example of a 16×16 intra prediction mode, and FIG. 3 is a diagram showing an example of a 4×4 intra prediction mode.

Referring to FIG. 2, the 16×16 intra prediction mode includes a total of four modes, e.g., a vertical mode, a horizontal mode, a direct current (DC) mode, and a plane mode. Referring to FIG. 3, the 4×4 intra prediction mode includes a total of nine modes, e.g., a vertical mode, a horizontal mode, a DC mode, a diagonal down-left mode, a diagonal down-right mode, a vertical right mode, a vertical left mode, a horizontal-up mode, and a horizontal-down mode.

For example, an operation of predicatively coding a current 4×4 block in mode 0, i.e., a vertical mode, of FIG. 3 will now be described. Initially, pixel values of upper adjacent pixels A to D of the current 4×4 block are predicted as pixel values of the current 4×4 block. That is, the value of pixel A is predicted as the value of four pixels included in a $1^{st}$ column of the current 4×4 block, the value of pixel B is predicted as the value of four pixels included in a $2^{nd}$ column of the current 4×4 block, the value of pixel C is predicted as the value of four pixels included in a $3^{rd}$ column of the current 4×4 block, and the value of pixel D is predicted as the value of four pixels included in a $4^{th}$ column of the current 4×4 block. A predicted block generated through intra prediction for extending values of adjacent pixels in a predetermined direction as described above has a predetermined directivity based on a prediction mode. The directivity in the predicted block may increase prediction efficiency when pixels of a current block to be encoded have a predetermined directivity but may reduce prediction efficiency when the pixels of the current block have no directivity. Therefore, as will be described below, the post-processor 140 of the image encoding apparatus 100 according to an embodiment generates a new predicted block by changing pixel values of pixels in the predicted block through calculation using each pixel in the predicted block and one or more adjacent pixels as a post-processing operation on the predicted block, and thus increases image prediction efficiency.

Referring back to FIG. 1, the transformer and quantizer 120 transforms and quantizes a residual corresponding to a difference value between the original image block and the predicted block output from the predictor 110 and the post-processor 140, and the entropy coder 130 variable-length-encodes and compresses the quantized residual data. The encoded residual is reconstructed through an inverse quantizer 114 and an inverse transformer 115, and an adder 116 reconstructs the current block by adding the reconstructed residual to the predicted block. The reconstructed block is stored in a storage (not shown) and is used as reference data to encode a next block.

The post-processing operation on the predicted block by the post-processor 140 of FIG. 1 will now be described.

The post-processor 140 generates a second predicted block by changing pixel values of pixels of a first predicted block, which is generated by the motion compensator 112 or the intra predictor 113, through calculation using each pixel and one or more adjacent pixels in the first predicted block. Herein, the motion compensator 112 may generate the first predicted block by performing general inter prediction. The intra predictor 113 may generate the first predicted block by performing general intra prediction.

Figure 4:
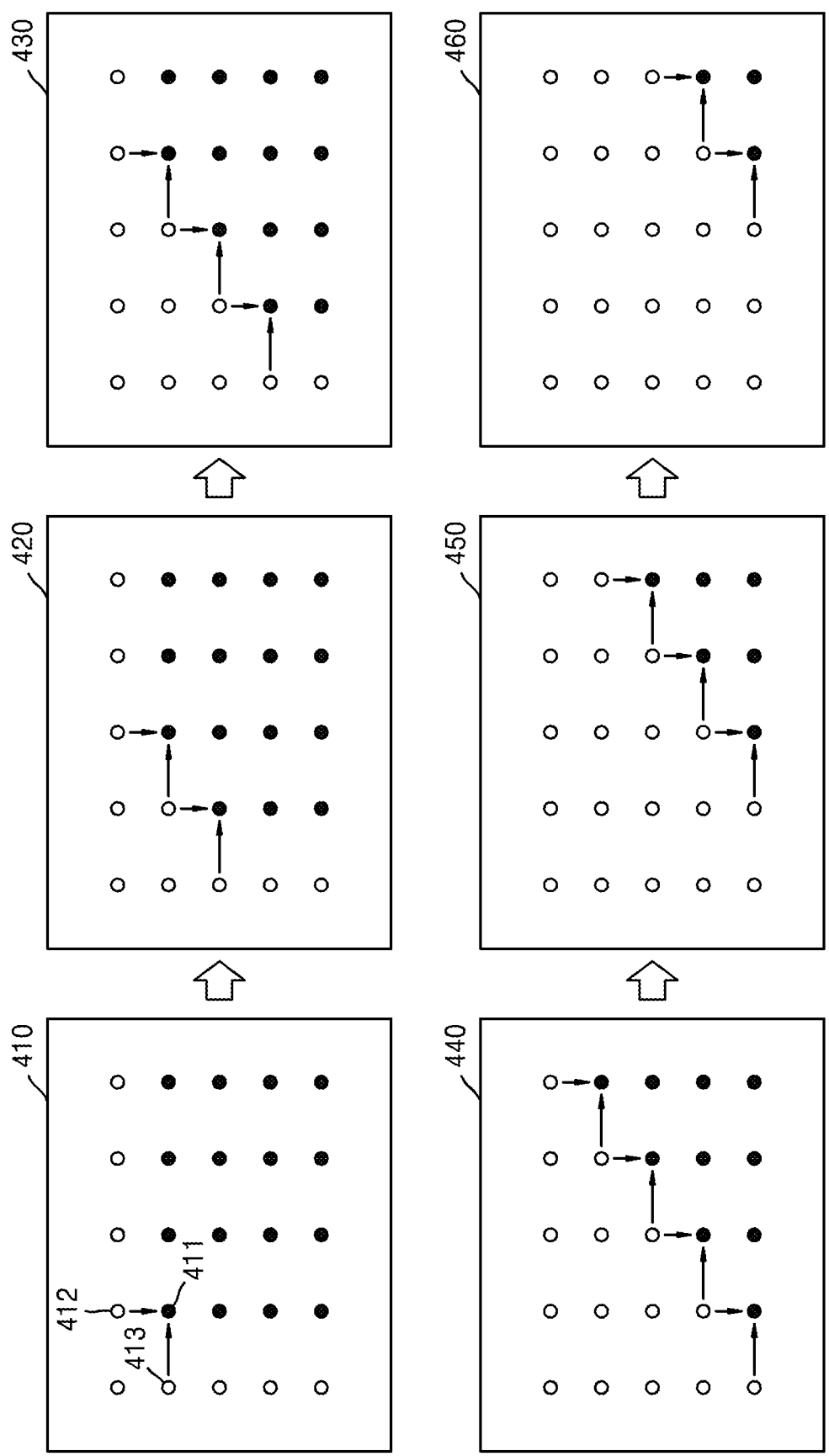
FIG. 4 is a schematic diagram for describing a post-processing operation on a first predicted block, according to an embodiment.

FIG. 4 is a schematic diagram for describing a post-processing operation on the first predicted block, according to an embodiment. In FIG. 4, reference numerals 410 to 460 show how values of pixels in the first predicted block to be processed by the post-processor 140 are changed in order of time.

Referring to FIG. 4, the post-processor 140 according to an embodiment may change pixel values of pixels of the first predicted block through calculation based on pixel values of a pixel to be changed in the first predicted block, and upper and left adjacent pixels thereof. Herein, weights may be given to the pixel to be changed and the upper and left pixels based on a first gradient value corresponding to a difference value between the pixel to be changed and the upper pixel and a second gradient value corresponding to a difference value between the pixel to be changed and the left pixel. For example, in FIG. 4, assuming that a pixel value of a current pixel 411 to be changed in a first predicted block 410 is f[1][1], a pixel value of a pixel 412 corresponding to an upper pixel is f[1][0], a pixel value of a pixel 413 corresponding to a left pixel is f[0][1], and a value obtained by changing the pixel value f[1][1] of the pixel 411 is f'[1][1], f'[1][1] may be calculated as shown in Equation 1.

$$f'[1][1] = \frac{1}{\alpha+\beta+\gamma}(\alpha f[1][1] + \beta f[1][0] + \gamma f[0][1]) \quad \langle\text{Equation 1}\rangle$$

In Equation 1, α, β, and γ denote weight values applied to the pixels 411, 412, and 413, respectively, may have arbitrary positive real values, and may be determined based on the first and second gradient values. An operation of determining the weight values applied to each of pixels will be described in detail below with reference to FIG. 6.

As illustrated in FIG. 4, the post-processor 140 according to an embodiment changes the pixel values of the pixels of the first predicted block in a direction from a top left side to a bottom right side through calculation for giving weights to a pixel to be changed and upper and left pixels thereof. However, the post-processing operation on the predicted block according to an embodiment is not limited to a direction from a top left side to a bottom right side and may be sequentially performed on the pixels of the first predicted block in a direction from a top right side to a bottom left side, in a direction from a bottom right side to a top left side, or in a direction from a bottom left side to a top right side. For example, when the pixel values of the pixels of the first predicted block are changed in a direction from a bottom right side to a top left side oppositely from the processing order shown in FIG. 4, gradient-based weights are applied to a pixel to be changed and lower and right pixels thereof.

Although upper and left pixels of a pixel to be changed are considered in FIG. 4, upper, lower, left, and right pixels of a pixel to be changed may be used according to another embodiment. Therefore, the post-processing operation on the first predicted block is not limited to using only upper and left pixels of a pixel to be changed. An embodiment in which a post-processing operation is performed using upper, lower, left, and right pixels of a current pixel will be described in detail below with reference to FIG. 6.

Figure 5:
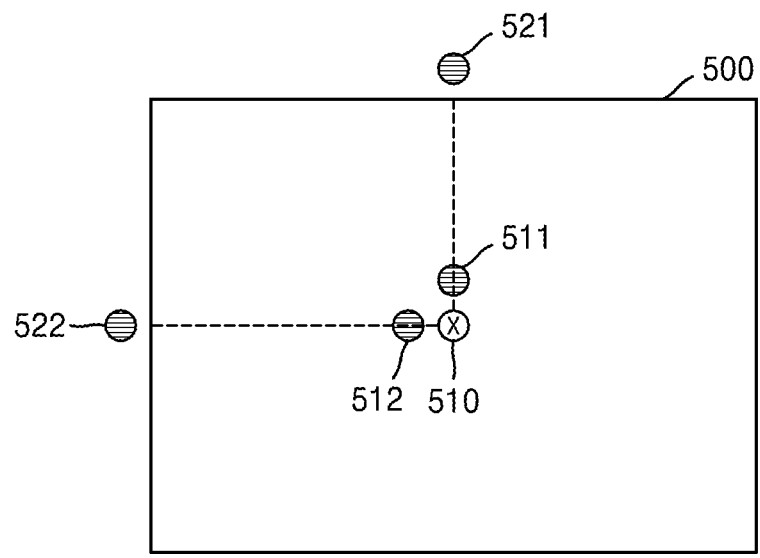
FIG. 5 is a schematic diagram for describing operation of a post-processor according to an embodiment.

FIG. 5 is a schematic diagram for describing operation of the post-processor 140 according to an embodiment. In FIG. 5, reference numeral 510 denotes a current pixel of a first predicted block 500, which is to be currently changed, reference numeral 511 denotes an upper pixel located at an upper side of the current pixel 510, and reference numeral 512 denotes a left pixel located at a left side of the current pixel 510.

Referring to FIG. 5, operation of the post-processor 140 according to an embodiment may be generalized as follows. Assuming that the size of the first predicted block 500 is m×n (where m and n are positive integers), a pixel value of the current pixel 510 to be changed in the first predicted block 500 and located in an $i^{th}$ column (where i is an integer from 0 to m−1) and a $j^{th}$ row (where j is an integer from 0 to n−1) is f[i][j], a pixel value of the upper pixel 511 located at an upper side of the current pixel 510 is f[i][j−1], and a pixel value of the left pixel 512 located at a left side of the current pixel 510 is f[i−1][j], the pixel value of the current pixel 510 is changed into f'[i][j] as shown in Equation 2.

$$f'[i][j] = \frac{1}{\alpha+\beta+\gamma}(\alpha f[i][j] + \beta f[i][j-1] + \gamma f[i-1][j]) \quad \langle\text{Equation 2}\rangle$$

In Equation 2, α, β, and γ denote weight values (or filter coefficients) applied to the pixels 510, 511, and 512, respectively, may have arbitrary positive real values, and may be determined based on the first and second gradient values.

The post-processor 140 generates a second predicted block by changing pixel values of all pixels of the first predicted block 500 by applying Equation 2 in a direction from a top left side to a bottom right side.

Figure 6:
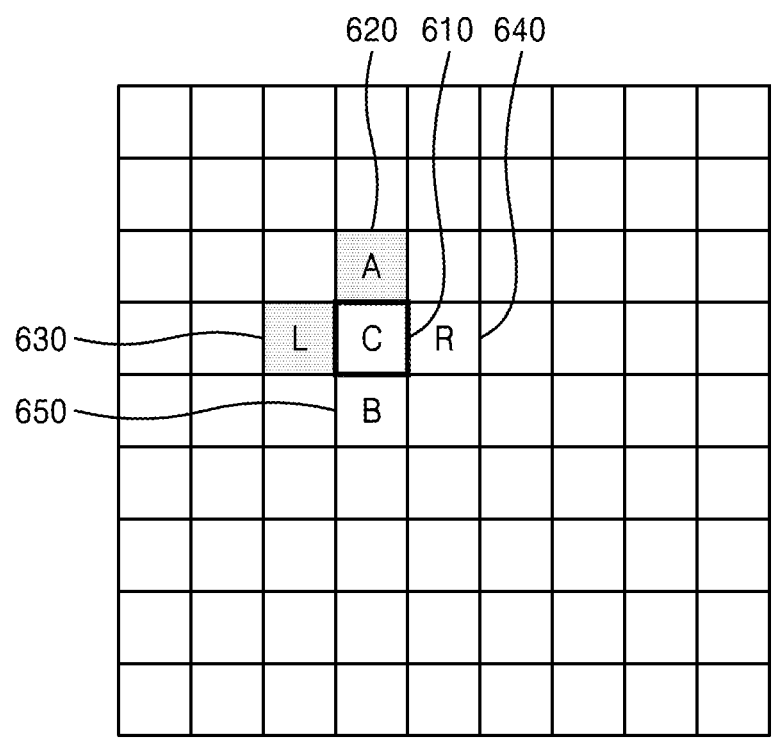
FIG. 6 is a schematic diagram for describing an operation of post-processing a first predicted block based on gradients between pixels, according to an embodiment.

FIG. 6 is a schematic diagram for describing an operation of post-processing a first predicted block based on gradients between pixels, according to an embodiment.

Referring to FIG. 6, when a pixel value of a current pixel 610 to be changed in the first predicted block is "C", a pixel value of an upper pixel 620 may be "A", a pixel value of a left pixel 630 may be "L", a pixel value of a right pixel 640 may be "R", and a pixel value of a lower pixel 650 may be "B".

According to an embodiment, the post-processor 140 may use pixel values of not only the upper pixel 620 and the left pixel 630 but also the right pixel 640 and the lower pixel 650 to change the pixel value of the current pixel 610. According to an embodiment, the post-processor 140 may determine weights to be given to the current pixel 610, the upper pixel 620, the left pixel 630, the right pixel 640, and the lower pixel 650. The weights may be determined based on a first gradient value indicating a difference value between the current pixel 610 and the upper pixel 620 (e.g., |A−C|), a second gradient value indicating a difference value between the current pixel 610 and the left pixel 630 (e.g., |L−C|), a third gradient value indicating a difference value between the current pixel 610 and the right pixel 640 (e.g., |R−C|), and a fourth gradient value indicating a difference value between the current pixel 610 and the lower pixel 650 (e.g., |B−C|). For example, a large weight may be given for a large gradient value.

According to an embodiment, the weights of the upper pixel 620 and the left pixel 630 may be initially determined and then the weights of the right pixel 640 and the lower pixel 650 may be determined based on the determined weights of the upper pixel 620 and the left pixel 630. For example, the weight of the upper pixel 620 may be greater than the weight of the left pixel 630 when the first gradient value is greater than the second gradient value, and the weight of the left pixel 630 may be greater than the weight of the upper pixel 620 when the second gradient value is greater than the first gradient value. The weights of the upper pixel 620 and the left pixel 630 may be equal when the first gradient value is equal to the second gradient value. After the weights of the upper pixel 620 and the left pixel 630 are determined, the weight of the right pixel 640 may be determined to be equal to the weight of the left pixel 630, and the weight of the lower pixel 650 may be determined to be equal to the weight of the upper pixel 620.

According to another embodiment, when the post-processor 140 uses only the upper pixel 620 and the left pixel 630 to change the pixel value of the current pixel 610, the weights of the right pixel 640 and the lower pixel 650 may be determined to be 0.

When the post-processor 140 uses only the upper pixel 620 and the left pixel 630 to change the pixel value of the current pixel 610 and the first gradient value is greater than the second gradient value, weights of 64, 40, and 24 may be given to the current pixel 610, the upper pixel 620, and the left pixel 630, respectively. As another example, when the second gradient value is greater than the first gradient value, weights of 64, 24, and 40 may be given to the current pixel 610, the upper pixel 620, and the left pixel 630, respectively.

The weights of the current pixel 610, the upper pixel 620, and the left pixel 630 may also be determined based on a direction of intra prediction used to generate the first predicted block. That is, when the direction of intra prediction used to generate the first predicted block is a vertical direction, the weight of the upper pixel 620 may be greater than the weight of the left pixel 630. Otherwise, when the direction of intra prediction used to generate the first predicted block is a horizontal direction, the weight of the left pixel 630 may be greater than the weight of the upper pixel 620.

Although the upper pixel 620, the left pixel 630, the right pixel 640, and the lower pixel 650 are adjacent to the current pixel 610 in the afore-described embodiment, according to various embodiments, the upper pixel 620, the left pixel 630, the right pixel 640, and the lower pixel 650 do not always need to be adjacent to the current pixel 610. For example, pixels used to post-process (or filter) the first predicted block may be pixels of fixed locations in a reference sample. According to an embodiment, the upper pixel 620, the left pixel 630, the right pixel 640, and the lower pixel 650 used to change the pixel value of the current pixel 610 may be pixels generated in a reference sample or a predicted block.

As described above, prediction performance may be increased by weakening the boundary between an adjacent block and a predicted block by post-processing the predicted block. In addition, when filtering is performed to give a large weight for a large gradient value between a current pixel and adjacent pixels as described above, prediction performance at a part where a difference between pixel values is large (i.e., a part where boundary discontinuity is serious) may be increased.

According to an embodiment, a post-processing operation using upper, lower, left, and right pixels of a current pixel may be generalized as follows. Assuming that the size of the first predicted block is m×n (where m and n are positive integers), a pixel value of the current pixel 610 to be changed in the first predicted block and located in an $i^{th}$ column (where i is an integer from 0 to m−1) and a $j^{th}$ row (where j is an integer from 0 to n−1) is f[i][j], a pixel value of the upper pixel 620 is f[i][j−1], a pixel value of the left pixel 630 is f[i−1][j], a pixel value of the right pixel 640 is f[i+1][j], and a pixel value of the lower pixel 650 is f[i][j+1], the pixel value of the current pixel 610 is changed into f'[i][j] as shown in Equation 3.

$$f'[i][j] = \frac{1}{\alpha+\beta+\gamma+\delta+\varepsilon}(\alpha f[i][j] + \beta f[i][j-1] + \gamma f[i-1][j] + \delta f[i+1][j] + \varepsilon f[i][j+1]) \quad \langle\text{Equation 3}\rangle$$

In Equation 3, $\alpha$, $\beta$, $\gamma$, $\delta$, and $\varepsilon$ denote weight values (or filter coefficients) applied to the pixels 610, 620, 630, 640, and 650, respectively, may have arbitrary positive real values, and may be determined based on the first to fourth gradient values.

According to an embodiment, after a pixel value of a current pixel is changed, a post-processing operation for changing a pixel value of a next pixel adjacent to the current pixel may be performed. In this case, like the changed pixel value of the current pixel, the pixel value of the next pixel may be changed based on gradient values between the next pixel and adjacent pixels. As described above, the post-processor 140 according to an embodiment may generate a second predicted block by changing pixel values of pixels of the first predicted block in a predetermined direction through calculation for giving weights to a pixel to be changed and adjacent pixels thereof. The post-processing operation on the predicted block according to an embodiment is not limited to a direction from a top left side to a bottom right side and may be sequentially performed on the pixels of the first predicted block in a direction from a top right side to a bottom left side, in a direction from a bottom right side to a top left side, or in a direction from a bottom left side to a top right side.

According to an embodiment, the post-processing operation may be repeated on the first predicted block by a predetermined number of times. For example, a $1^{st}$ filtered block may be generated by performing the post-processing operation on the first predicted block according to the afore-described embodiment, and a $2^{nd}$ filtered block may be generated by performing the post-processing operation again on the $1^{st}$ filtered block. The post-processor 140 according to an embodiment may generate a $k^{th}$ filtered block by performing the post-processing operation on the first predicted block by k times (where k is a positive integer). In this case, the finally generated $k^{th}$ filtered block may serve as the second predicted block. The number of times that the post-processing operation is performed, i.e., k, is a preset value and may be included in information transmitted from the image encoding apparatus 100 to an image decoding apparatus 700 (see FIG. 7). In addition, the post-processor 140 may repeatedly change pixel values of pixels in the second predicted block until a difference between pixel values of each pixel before and after being changed converges to be equal to or less than a predetermined threshold value.

Referring back to FIG. 1, a controller (not shown) compares costs of a bitstream obtained by encoding second predicted blocks generated by performing the above-described calculation according to an embodiment, and adds calculation information used to generate the second predicted block having the lowest cost, to a header region of the bitstream. When the calculation information is added to the bitstream, the controller may identify different calculation modes by performing variable length encoding for assigning small bits for a calculation mode, which is used a lot, based on distribution information of calculation modes determined when a predetermined number of blocks are encoded.

When a block is partitioned into sub-blocks and prediction is performed on each sub-block, the second predicted block may be generated by applying different calculation modes to the sub-blocks, or the same calculation mode may be applied to the sub-blocks included in the same block to simplify calculation and to reduce overheads.

To obtain a cost for determining an optimal calculation mode, rate-distortion optimization may be used. Since an image encoding method according to an embodiment is applied to a predicted block used as a reference block of another block, in rate-distortion optimization, a cost may be calculated by giving a high weight to a distortion value. That is, in conventional rate-distortion optimization, a cost is calculated based on a distortion value corresponding to a difference value between an encoded image and an original image, and a generated bitrate as shown in Cost=distortion+bitrate.

On the other hand, in the image encoding method according to an embodiment, an optimal calculation mode may be determined by giving a high weight to a distortion value compared to conventional rate-distortion optimization, as shown in Cost=α*distortion+bitrate (where a is a real value equal to or greater than 2).

The image encoding apparatus 100 according to an embodiment may determine whether to perform a post-processing operation on an intra- or inter-predicted first predicted block, by calculating a cost for determining an optimal calculation mode. In addition, the image encoding apparatus 100 according to an embodiment may determine whether to variably perform filtering, based on a block size of a block, a block mode, an intra prediction direction, coding information of an adjacent block, characteristics of an adjacent image, user input, calculation complexity, various parameters, etc. The image encoding apparatus 100 according to an embodiment may transmit filtering information, which indicates whether to perform filtering, to the image decoding apparatus 700 by using a bitstream. In this case, the filtering information may be signaled in, for example, a block, slice, picture, sequence, or video unit.

Figure 7:
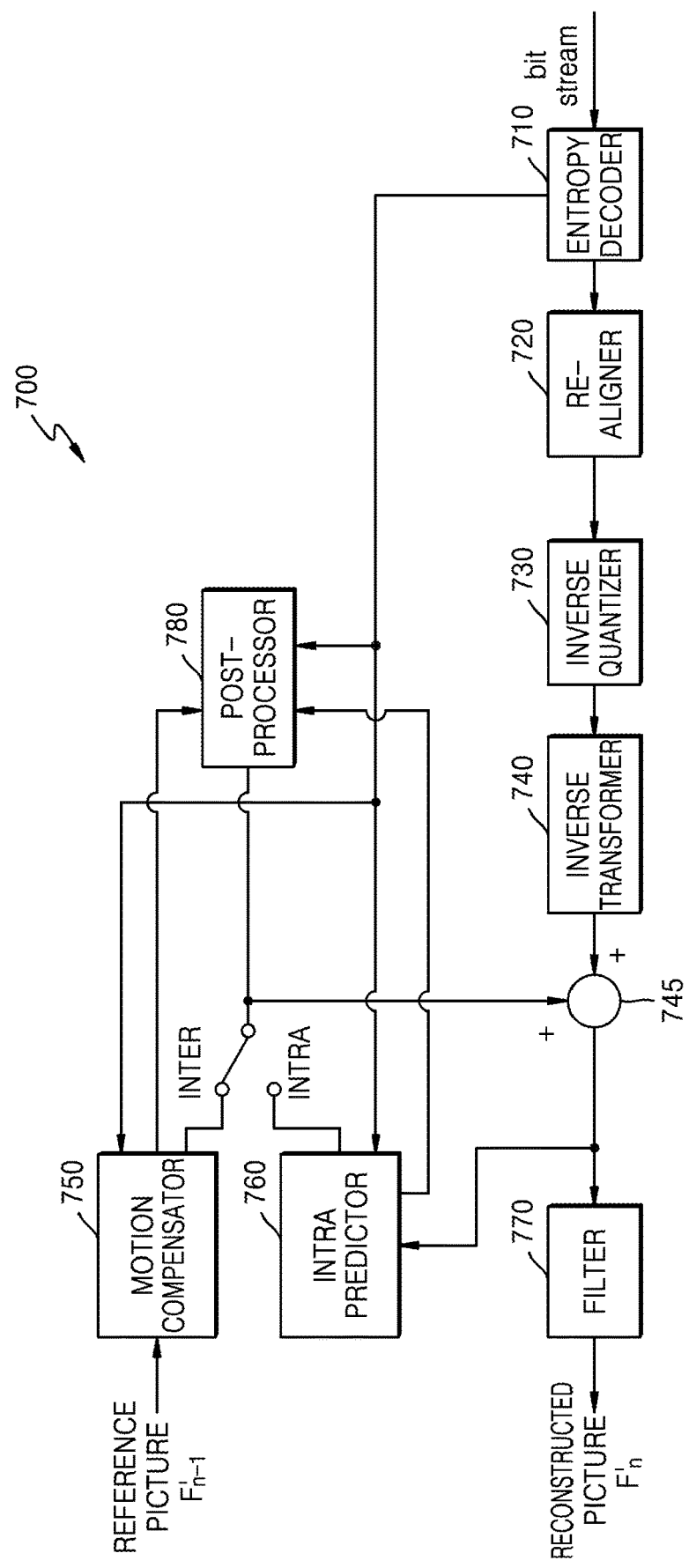
FIG. 7 is a block diagram showing a configuration of an image decoding apparatus according to an embodiment.

FIG. 7 is a block diagram showing a configuration of an image decoding apparatus 700 according to an embodiment.

Referring to FIG. 7, the image decoding apparatus 700 includes an entropy decoder 710, a re-aligner 720, an inverse quantizer 730, an inverse transformer 740, an adder 745, a motion compensator 750, an intra predictor 760, a filter 770, and a post-processor 780.

The entropy decoder 710 obtains image data of each coding unit by parsing a bitstream received by the image decoding apparatus 700. The entropy decoder 710 may extract information about a current picture or slice from parameter set raw byte sequence payload (RBSP) of the current picture or slice.

The image decoding apparatus 700 according to an embodiment extracts information about the size of a largest coding unit, a block shape and a partitioning method of coding units partitioned from the largest coding unit, and a coding mode of the coding unit, by parsing the received bitstream. The information about the block shape, the partitioning method, and the coding mode is used for decoding, and the information about the coding mode may include information about a block shape, a partitioning method, a prediction mode of each coding unit, the size of a transformation unit, etc.

The entropy decoder 710 according to an embodiment receives the compressed bitstream and extracts prediction mode information of a current block and post-processing calculation information used to generate a second predicted block, by entropy-decoding the received bitstream. In addition, the entropy decoder 710 extracts a quantized transformation coefficient of the current block by entropy-decoding texture data. The inverse quantizer 730 and the inverse transformer 740 reconstruct a residual corresponding to a difference between the current block and the second predicted block in the encoding operation by inversely quantizing and inversely transforming the quantized transformation coefficient. The motion compensator 750 and the intra predictor 760 generate and output a first predicted block based on the prediction mode of the current block. When the current block has been encoded using the second predicted block generated by the above-described post-processor 140 of FIG. 1, the post-processor 780 generates a second predicted block by changing pixel values of the first predicted block generated by the motion compensator 750 or the intra predictor 760, based on the post-processing calculation information extracted from the bitstream. Except that the post-processor 780 of the image decoding apparatus 700 generates the second predicted block based on the post-processing calculation information extracted from the bitstream, operation of the post-processor 780 is the same as the operation of the post-processor 140 of FIG. 1, and thus a detailed description thereof will now be provided herein.

According to an embodiment, the post-processing calculation information extracted from the bitstream may include filtering information indicating whether to filter the first predicted block. Therefore, when the filtering information indicates to filter the first predicted block, a post-processing operation for changing a pixel value of a current pixel in the first predicted block based on gradient values between the current pixel and adjacent pixels of the current pixel may be performed. However, when the filtering information indicates not to filter the first predicted block, the post-processing operation of the post-processor 780 is not performed and the second predicted block is the same as the first predicted block.

In addition, according to an embodiment, the post-processing calculation information extracted from the bitstream may include information about the number of times that filtering is repeated. The post-processor 780 according to an embodiment may repeat the post-processing operation based on the information about the number of times that filtering is repeated, which is extracted from the bitstream.

The information indicating whether to perform filtering and the information indicating the number of times that filtering is performed, according to an embodiment, may be included in one of bitstreams related to various data units. For example, the image decoding apparatus 700 may use the information indicating whether to perform filtering or the information indicating the number of times that filtering is performed, which is included in a sequence parameter set, a picture parameter set, a video parameter set, a slice header, or a slice segment header. Furthermore, the image decoding apparatus 700 may obtain syntax corresponding to the information indicating whether to perform filtering or the information indicating the number of times that filtering is performed, from a bitstream with respect to each largest coding unit, reference coding unit, or processing block, and use the obtained syntax.

The adder 745 decodes the current block by adding the first predicted block generated by the motion compensator 750 or the intra predictor 760, to the reconstructed residual. In particular, when the current block to be decoded has been encoded based on the second predicted block according to the afore-described embodiments, the adder 745 decodes the current block by adding the second predicted block generated by the post-processor 780, to the reconstructed residual. The decoded block is stored in a predetermined memory through the filter 770 and then is used as reference data to decode a next block.

Figure 8:
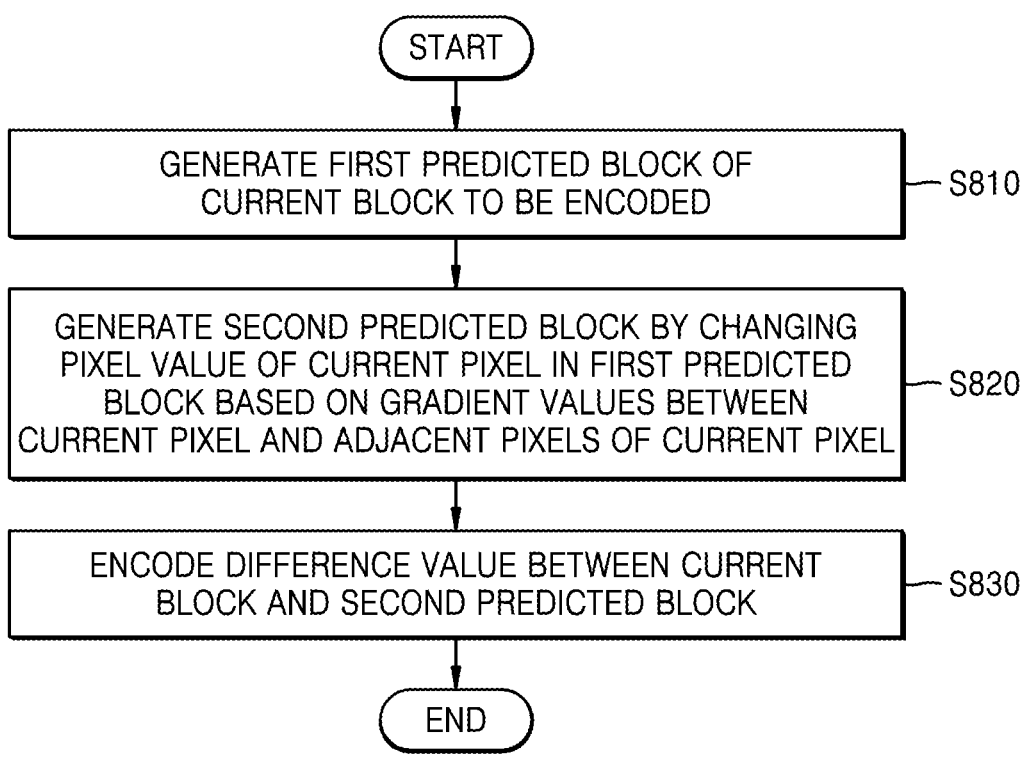
FIG. 8 is a flowchart of an image encoding method according to an embodiment.

FIG. 8 is a flowchart of an image encoding method according to an embodiment.

Referring to FIG. 8, in operation S810, a first predicted block of a current block to be encoded is generated. Herein, the first predicted block may be a predicted block generated by performing general intra prediction or inter prediction.

In operation S820, a second predicted block is generated by changing a pixel value of a current pixel in the first predicted block based on gradient values between the current pixel and adjacent pixels of the current pixel. As described above in an embodiment of the post-processor 140, the second predicted block is generated by changing pixel values of pixels of the first predicted block by applying gradient-based weights to a pixel to be changed in the first predicted block, and adjacent pixels thereof.

In operation S830, a difference value between the current block and the second predicted block is encoded. That is, a bitstream is generated by transforming, quantizing, and entropy-encoding a residual corresponding to the difference value between the current block and the second predicted block. Calculation information used to generate the second predicted block is added to a predetermined part of the generated bitstream to allow an image decoding apparatus to generate a second predicted block of the current block.

Figure 9:
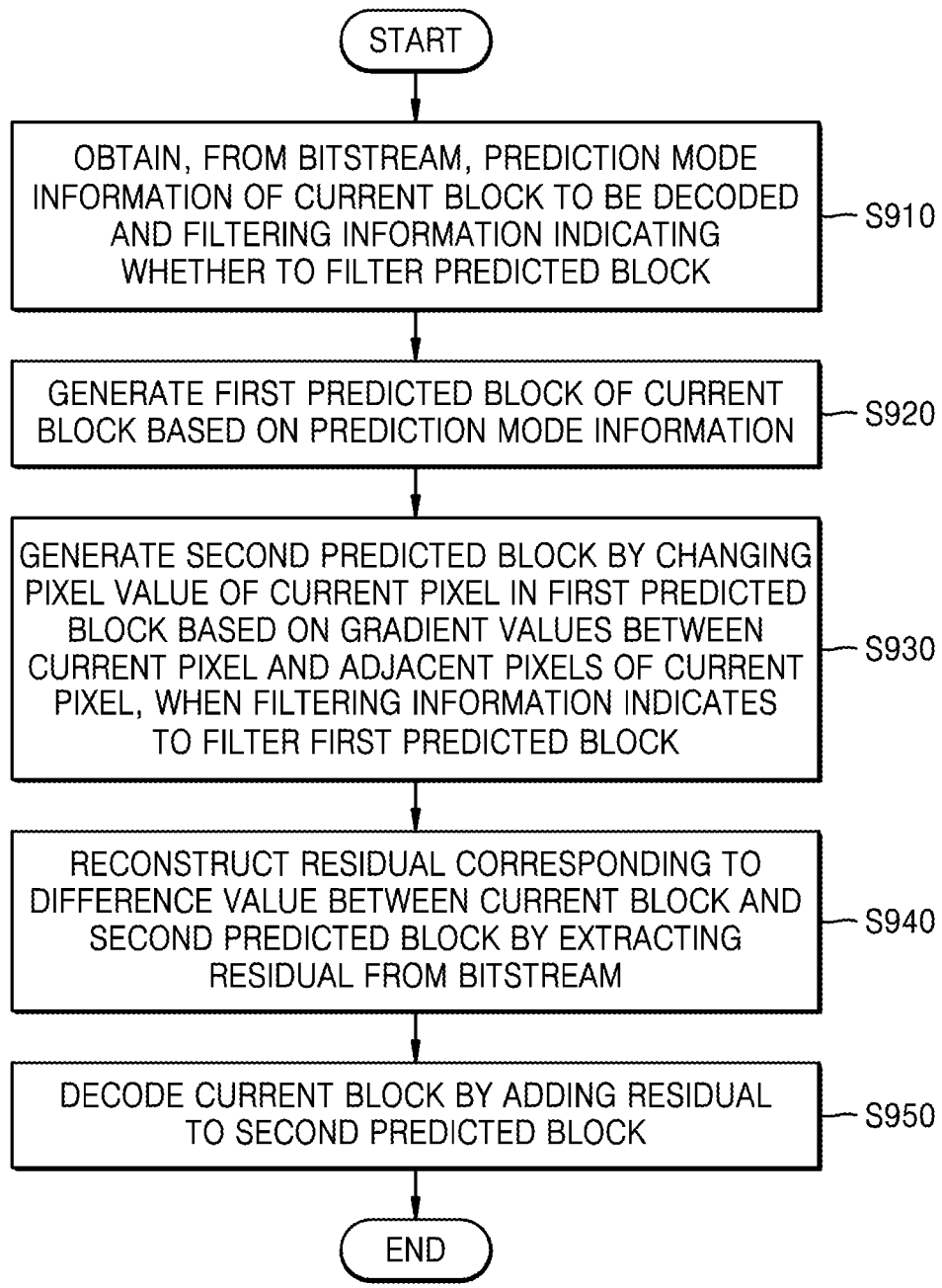
FIG. 9 is a flowchart of an image decoding method according to an embodiment.

FIG. 9 is a flowchart of an image decoding method according to an embodiment.

Referring to FIG. 9, in operation S910, prediction mode information of a current block to be decoded and filtering information indicating whether to filter a predicted block are obtained from a bitstream.

In operation S920, a first predicted block of the current block is generated based on the prediction mode information.

In operation S930, a second predicted block is generated by changing a pixel value of a current pixel in the first predicted block based on gradient values between the current pixel and adjacent pixels of the current pixel, when the filtering information indicates to filter the first predicted block.

In operation S940, a residual corresponding to a difference value between the current block and the second predicted block is reconstructed by extracting the residual from the bitstream.

In operation S950, the current block is decoded by adding the residual to the second predicted block.

A method of determining a data unit of an image, according to an embodiment, will now be described with reference to FIGS. 10 to 23.

Figure 10:
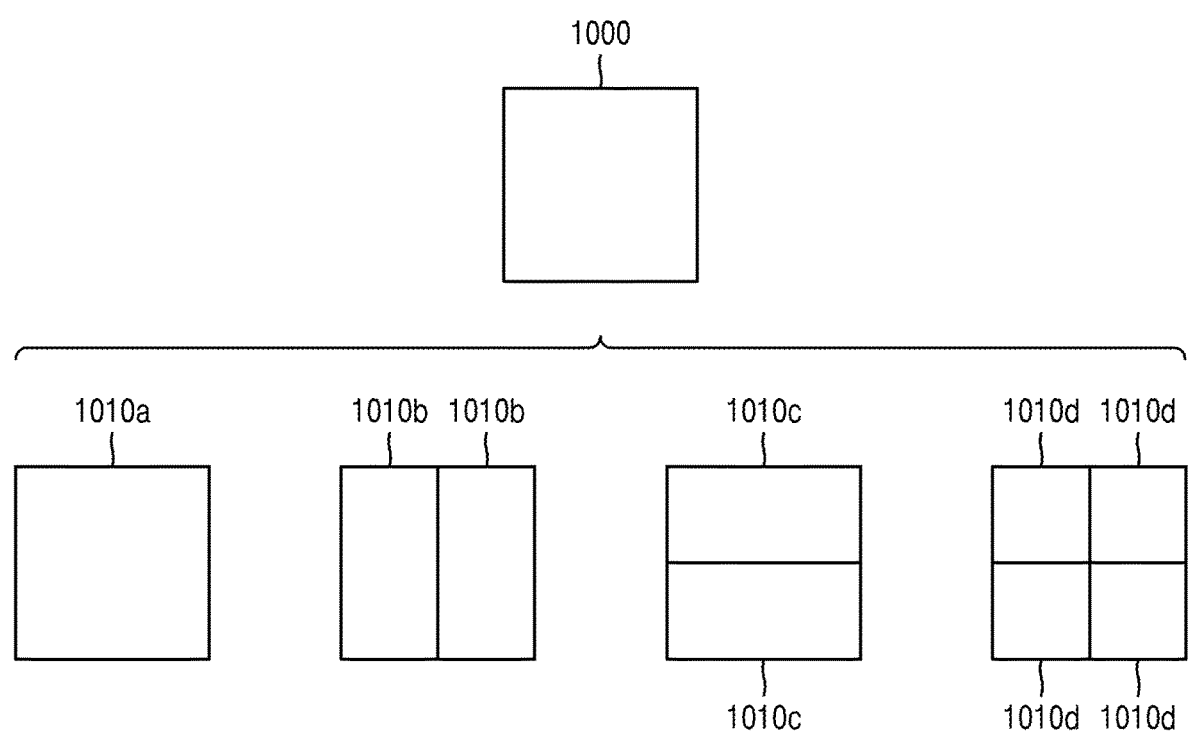
FIG. 10 illustrates an operation of determining one or more coding units by partitioning a current coding unit, according to an embodiment.

FIG. 10 illustrates an operation, performed by the image decoding apparatus 700, of determining one or more coding units by partitioning a current coding unit, according to an embodiment.

According to an embodiment, the image decoding apparatus 700 may determine the shape of a coding unit by using block shape information, and determine a partitioning method of the coding unit by using the partitioning method information. That is, a coding unit partitioning method indicated by the partitioning method information may be determined based on a block shape indicated by the block shape information used by the image decoding apparatus 700.

According to an embodiment, the image decoding apparatus 700 may use the block shape information indicating that the current coding unit has a square shape. For example, the image decoding apparatus 700 may determine whether not to partition a square coding unit or to partition a square coding unit vertically, horizontally, or into four coding units, based on the partitioning method information. Referring to FIG. 10, when the block shape information of a current coding unit 1000 indicates a square shape, the image decoding apparatus 700 may determine a coding unit 1010a having the same size as the current coding unit 1000, based on the partitioning method information indicating not to perform partitioning, or determine coding units 1010b, 1010c, or 1010d partitioned based on the partitioning method information indicating a predetermined partitioning method.

Referring to FIG. 10, according to an embodiment, the image decoding apparatus 700 may determine two coding units 1010b obtained by partitioning the current coding unit 1000 in a vertical direction, based on the partitioning method information indicating to perform partitioning in a vertical direction. The image decoding apparatus 700 may determine two coding units 1010c obtained by partitioning the current coding unit 1000 in a horizontal direction, based on the partitioning method information indicating to perform partitioning in a horizontal direction. The image decoding apparatus 700 may determine four coding units 1010d obtained by partitioning the current coding unit 1000 in vertical and horizontal directions, based on the partitioning method information indicating to perform partitioning in vertical and horizontal directions. However, partitioning methods of a square coding unit are not limited to the above-described methods, and the partitioning method information may indicate various methods. Predetermined partitioning methods for partitioning a square coding unit will be described in detail below in relation to various embodiments.

FIG. 11 illustrates an operation, performed by the image decoding apparatus 700, of determining one or more coding units by partitioning a non-square coding unit, according to an embodiment.

According to an embodiment, the image decoding apparatus 700 may use block shape information indicating that a current coding unit has a non-square shape. The image decoding apparatus 700 may determine whether not to partition the non-square current coding unit or to partition the non-square current coding unit by using a predetermined partitioning method, based on partitioning method information. Referring to FIG. 11, when the block shape information of a current coding unit 1100 or 1150 indicates a non-square shape, the image decoding apparatus 700 may determine a coding unit 1110 or 1160 having the same size as the current coding unit 1100 or 1150, based on the partitioning method information indicating not to perform partitioning, or determine coding units 1120a and 1120b, 1130a to 1130c, 1170a and 1170b, or 1180a to 1180c partitioned based on the partitioning method information indicating a predetermined partitioning method. Predetermined partitioning methods for partitioning a non-square coding unit will be described in detail below in relation to various embodiments.

According to an embodiment, the image decoding apparatus 700 may determine a partitioning method of a coding unit by using the partitioning method information and, in this case, the partitioning method information may indicate the number of one or more coding units generated by partitioning a coding unit. Referring to FIG. 11, when the partitioning method information indicates to partition the current coding unit 1100 or 1150 into two coding units, the image decoding apparatus 700 may determine two coding units 1120a and 1120b, or 1170a and 1170b included in the current coding unit 1100 or 1150, by partitioning the current coding unit 1100 or 1150 based on the partitioning method information.

According to an embodiment, when the image decoding apparatus 700 partitions the non-square current coding unit 1100 or 1150 based on the partitioning method information, the location of a long side of the non-square current coding unit 1100 or 1150 may be considered. For example, the image decoding apparatus 700 may determine a plurality of coding units by dividing a long side of the current coding unit 1100 or 1150 considering the shape of the current coding unit 1100 or 1150.

According to an embodiment, when the partitioning method information indicates to partition a coding unit into an odd number of blocks, the image decoding apparatus 700 may determine an odd number of coding units included in the current coding unit 1100 or 1150. For example, when the partitioning method information indicates to partition the current coding unit 1100 or 1150 into three coding units, the image decoding apparatus 700 may partition the current coding unit 1100 or 1150 into three coding units 1130a to 1130c, or 1180a to 1180c. According to an embodiment, the image decoding apparatus 700 may determine an odd number of coding units included in the current coding unit 1100 or 1150, and not all the determined coding units have the same size. For example, a predetermined coding unit 1130b or 1180b among the determined odd number of coding units 1130a to 1130c, or 1180a to 1180c may have a size different from the size of the other coding units 1130a and 1130c, or 1180a and 1180c. That is, coding units which may be determined by partitioning the current coding unit 1100 or 1150 may have multiple sizes and, in some cases, all of the odd number of coding units 1130a to 1130c, or 1180a to 1180c may have different sizes.

According to an embodiment, when the partitioning method information indicates to partition a coding unit into an odd number of blocks, the image decoding apparatus 700 may determine an odd number of coding units included in the current coding unit 1100 or 1150, and put a predetermined restriction on at least one coding unit among the odd number of coding units generated by partitioning the current coding unit 1100 or 1150. Referring to FIG. 11, the image decoding apparatus 700 may set a decoding method of the coding unit 1130b or 1180b of a center location among the three coding units 1130a to 1130c, or 1180a to 1180c generated by partitioning the current coding unit 1100 or 1150, to be different from that of the other coding units 1130a and 1130c, or 1180a and 1180c. For example, the image decoding apparatus 700 may restrict the coding unit 1130b or 1180b of the center location to be no longer partitioned or to be partitioned by only a predetermined number of times, unlike the other coding units 1130a and 1130c, or 1180a and 1180c.

Figure 12:
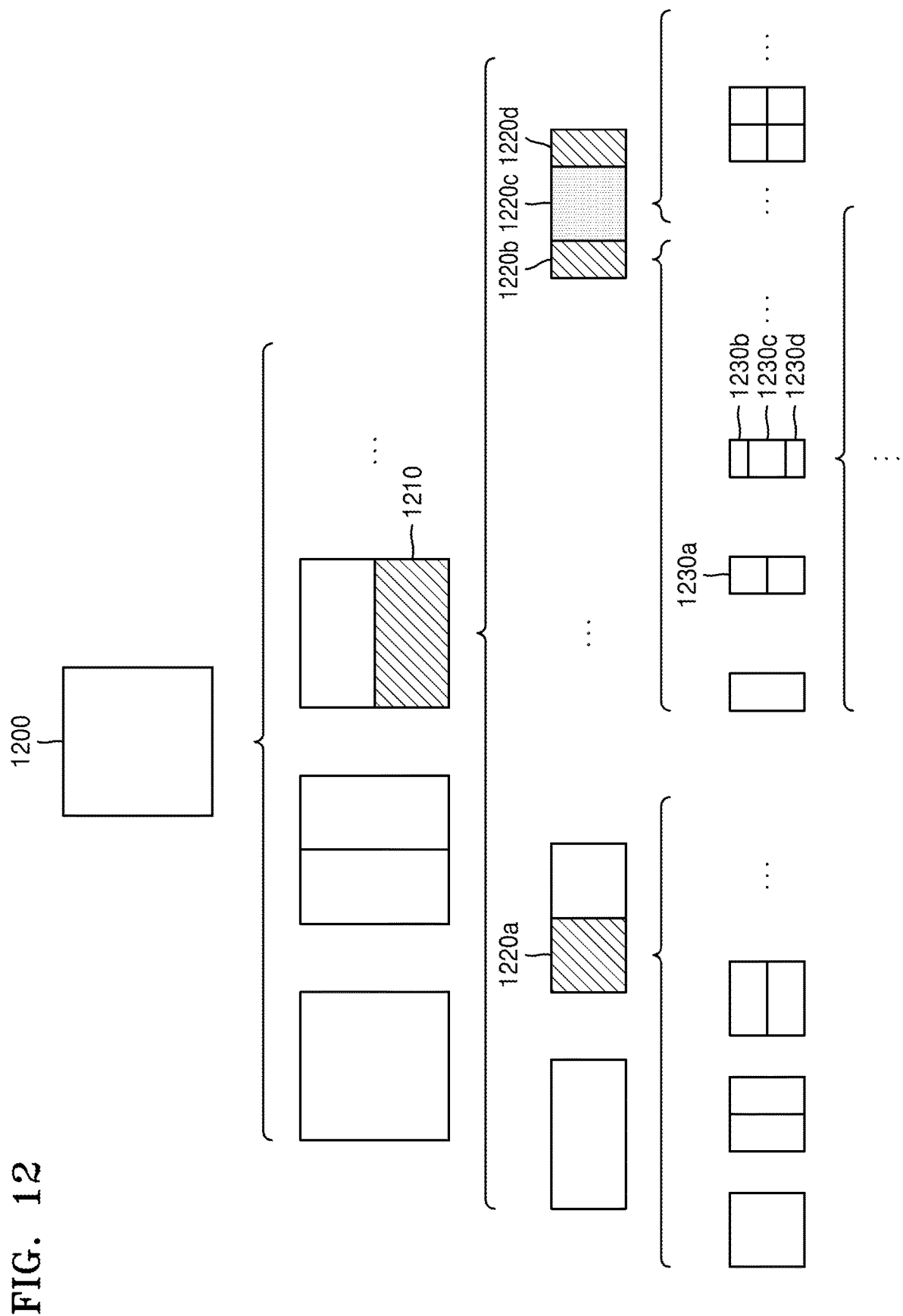
FIG. 12 illustrates an operation of partitioning a coding unit based on at least one of block shape information and partitioning method information, according to an embodiment.

FIG. 12 illustrates an operation, performed by the image decoding apparatus 700, of partitioning a coding unit based on at least one of block shape information and partitioning method information, according to an embodiment.

According to an embodiment, the image decoding apparatus 700 may determine to or not to partition a square first coding unit 1200 into coding units, based on at least one of the block shape information and the partitioning method information. According to an embodiment, when the partitioning method information indicates to partition the first coding unit 1200 in a horizontal direction, the image decoding apparatus 700 may determine a second coding unit 1210 by partitioning the first coding unit 1200 in a horizontal direction. According to an embodiment, terms such as first coding unit, second coding unit, and third coding unit are used to understand a hierarchical partitioning structure. For example, a second coding unit may be determined by partitioning a first coding unit, and a third coding unit may be determined by partitioning the second coding unit. It will be understood that the structure of the first, second, and third coding units follows the above description.

According to an embodiment, the image decoding apparatus 700 may determine to or not to partition the determined second coding unit 1210 into coding units, based on at least one of the block shape information and the partitioning method information. Referring to FIG. 12, the image decoding apparatus 700 may or may not partition the non-square second coding unit 1210, which is determined by partitioning the first coding unit 1200, into one or more third coding units 1220a, or 1220b to 1220d based on at least one of the block shape information and the partitioning method information. The image decoding apparatus 700 may obtain at least one of the block shape information and the partitioning method information, and determine a plurality of various-shaped second coding units (e.g., 1210) by partitioning the first coding unit 1200 based on the obtained at least one of the block shape information and the partitioning method information, and the second coding unit 1210 may be partitioned by using the partitioning method of the first coding unit 1200 based on at least one of the block shape information and the partitioning method information. According to an embodiment, when the first coding unit 1200 is partitioned into the second coding units 1210 based on at least one of the block shape information and the partitioning method information of the first coding unit 1200, the second coding unit 1210 may also be partitioned into the third coding units 1220*a*, or 1220*b* to 1220*d* based on at least one of the block shape information and the partitioning method information of the second coding unit 1210. That is, a coding unit may be recursively partitioned based on at least one of the block shape information and the partitioning method information of each coding unit. Therefore, a square coding unit may be determined by partitioning a non-square coding unit, and a non-square coding unit may be determined by recursively partitioning the square coding unit. Referring to FIG. 12, a predetermined coding unit among an odd number of third coding units 1220*b* to 1220*d* determined by partitioning the non-square second coding unit 1210 (e.g., a coding unit of a center location or a square coding unit) may be recursively partitioned. According to an embodiment, the square third coding unit 1220*c* among the odd number of third coding units 1220*b* to 1220*d* may be partitioned in a horizontal direction into a plurality of fourth coding units. A non-square fourth coding unit among the plurality of fourth coding units may be partitioned into a plurality of coding units. For example, the non-square fourth coding unit 1240 may be partitioned into an odd number of coding units.

Methods usable to recursively partitioning a coding unit will be described below in relation to various embodiments.

According to an embodiment, the image decoding apparatus 700 may determine to partition each of the third coding units 1220*a*, or 1220*b* to 1220*d* into coding units or not to partition the second coding unit 1210, based on at least one of the block shape information and the partitioning method information. According to an embodiment, the image decoding apparatus 700 may partition the non-square second coding unit 1210 into the odd number of third coding units 1220*b* to 1220*d*. The image decoding apparatus 700 may put a predetermined restriction on a predetermined third coding unit among the odd number of third coding units 1220*b* to 1220*d*. For example, the image decoding apparatus 700 may restrict the coding unit 1220*c* of a center location among the odd number of third coding units 1220*b* to 1220*d* to be no longer partitioned or to be partitioned by a settable number of times. Referring to FIG. 12, the image decoding apparatus 700 may restrict the coding unit 1220*c* of the center location among the odd number of third coding units 1220*b* to 1220*d* included in the non-square second coding unit 1210, to be no longer partitioned, to be partitioned using a predetermined partitioning method (e.g., partitioned into only four coding units or partitioned using a partitioning method of the second coding unit 1210), or to be partitioned by only a predetermined number of times (e.g., partitioned by only n times (where n>0)). However, the restrictions on the coding unit 1220*c* of the center location are not limited to the above-described examples, and may include various restrictions for decoding the coding unit 1220*c* of the center location differently from the other coding units 1220*b* and 1220*d*.

According to an embodiment, the image decoding apparatus 700 may obtain at least one of the block shape information and the partitioning method information, which is used to partition a current coding unit, from a predetermined location in the current coding unit.

Figure 13:
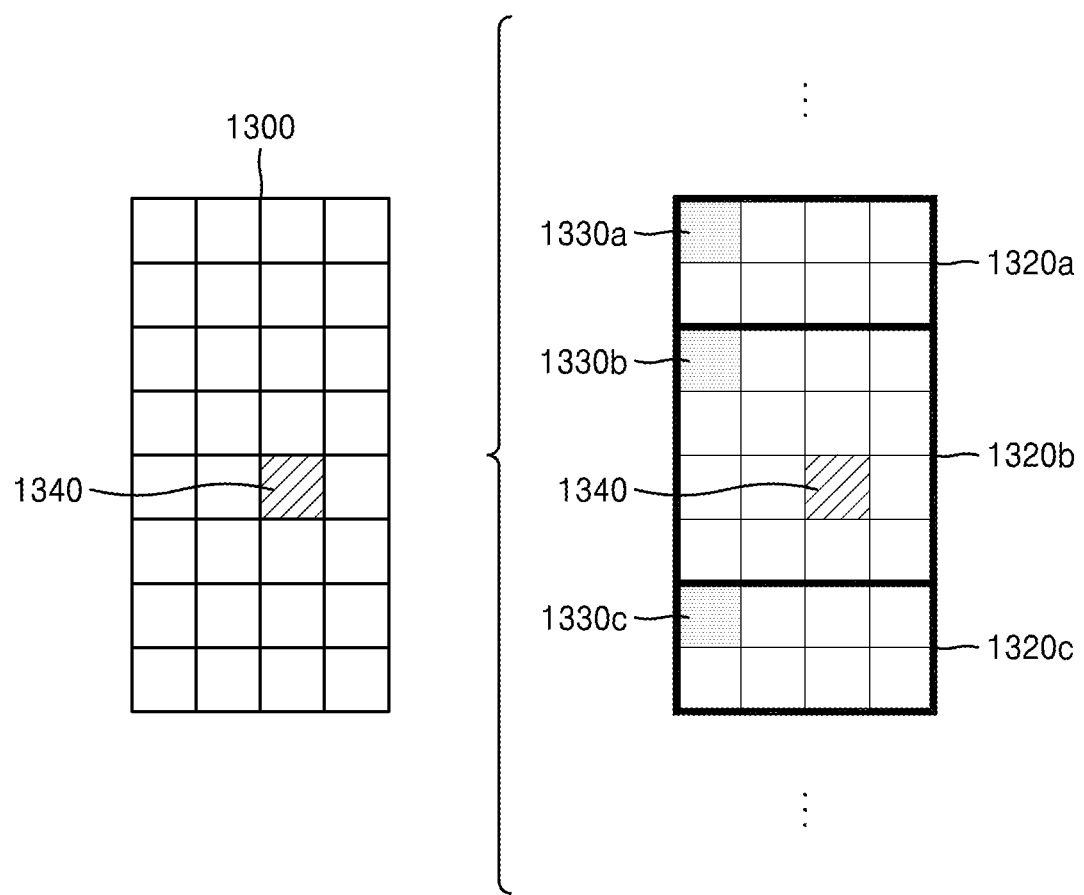
FIG. 13 illustrates a method of determining a predetermined coding unit among an odd number of coding units, according to an embodiment.

FIG. 13 illustrates a method, performed by the image decoding apparatus 700, of determining a predetermined coding unit among an odd number of coding units, according to an embodiment. Referring to FIG. 13, at least one of block shape information and partitioning method information of a current coding unit 1300 may be obtained from a sample of a predetermined location among a plurality of samples included in the current coding unit 1300 (e.g., a sample 1340 of a center location). However, the predetermined location in the current coding unit 1300, from which at least one of the block shape information and the partitioning method information may be obtained, is not limited to the center location in FIG. 13, and may include various locations included in the current coding unit 1300 (e.g., top, bottom, left, right, top left, bottom left, top right, and bottom right locations). The image decoding apparatus 700 may obtain at least one of the block shape information and the partitioning method information from the predetermined location and determine to or not to partition the current coding unit into various-shaped and various-sized coding units.

According to an embodiment, when the current coding unit is partitioned into a predetermined number of coding units, the image decoding apparatus 700 may select one of the coding units. Various methods may be used to select one of a plurality of coding units, as will be described below in relation to various embodiments.

According to an embodiment, the image decoding apparatus 700 may partition the current coding unit into a plurality of coding units, and determine a coding unit of a predetermined location.

FIG. 13 illustrates a method, performed by the image decoding apparatus 700, of determining a coding unit of a predetermined location among an odd number of coding units, according to an embodiment.

According to an embodiment, the image decoding apparatus 700 may use information indicating locations of the odd number of coding units, to determine a coding unit of a center location among the odd number of coding units. Referring to FIG. 13, the image decoding apparatus 700 may determine an odd number of coding units 1320*a* to 1320*c* by partitioning the current coding unit 1300. The image decoding apparatus 700 may determine a coding unit 1320*b* of a center location by using information about locations of the odd number of coding units 1320*a* to 1320*c*. For example, the image decoding apparatus 700 may determine the coding unit 1320*b* of the center location by determining the locations of the coding units 1320*a* to 1320*c* based on information indicating locations of predetermined samples included in the coding units 1320*a* to 1320*c*. Specifically, the image decoding apparatus 700 may determine the coding unit 1320*b* of the center location by determining the locations of the coding units 1320*a* to 1320*c* based on information indicating locations of top left samples 1330*a* to 1330*c* of the coding units 1320*a* to 1320*c*.

According to an embodiment, the information indicating the locations of the top left samples 1330*a* to 1330*c*, which are included in the coding units 1320*a* to 1320*c*, respectively, may include information about locations or coordinates of the coding units 1320*a* to 1320*c* in a picture. According to an embodiment, the information indicating the locations of the top left samples 1330*a* to 1330*c*, which are included in the coding units 1320*a* to 1320*c*, respectively, may include information indicating widths or heights of the coding units 1320*a* to 1320*c* included in the current coding unit 1300, and the widths or heights may correspond to information indicating differences between the coordinates of the coding units 1320*a* to 1320*c* in the picture. That is, the image decoding apparatus 700 may determine the coding unit 1320*b* of the center location by directly using the information about the locations or coordinates of the coding units 1320*a* to 1320*c* in the picture, or by using the information about the widths or heights of the coding units, which correspond to the difference values between the coordinates.

According to an embodiment, information indicating the location of the top left sample 1330a of the upper coding unit 1320a may include a coordinate (xa, ya), information indicating the location of the top left sample 1330b of the middle coding unit 1320b may include a coordinate (xb, yb), and information indicating the location of the top left sample 1330c of the lower coding unit 1320c may include a coordinate (xc, yc). The image decoding apparatus 700 may determine the middle coding unit 1320b by using the coordinates of the top left samples 1330a to 1330c which are included in the coding units 1320a to 1320c, respectively. For example, when the coordinates of the top left samples 1330a to 1330c are sorted in an ascending or descending order, the coding unit 1320b including the coordinate (xb, yb) of the sample 1330b of a center location may be determined as a coding unit of a center location among the coding units 1320a to 1320c determined by partitioning the current coding unit 1300. However, the coordinates indicating the locations of the top left samples 1330a to 1330c may include coordinates indicating absolute locations in the picture, or may use a coordinate (dxb, dyb) indicating a relative location of the top left sample 1330b of the middle coding unit 1320b and a coordinate (dxc, dyc) indicating a relative location of the top left sample 1330c of the lower coding unit 1320c with reference to the location of the top left sample 1330a of the upper coding unit 1320a. A method of determining a coding unit of a predetermined location by using a coordinate of a sample included in the coding unit, as information indicating a location of the sample is not limited to the above-described method, and may include various arithmetic methods capable of using the coordinate of the sample.

According to an embodiment, the image decoding apparatus 700 may partition the current coding unit 1300 into a plurality of coding units 1320a to 1320c, and select one of the coding units 1320a to 1320c based on a predetermined criterion. For example, the image decoding apparatus 700 may select the coding unit 1320b, which has a size different from that of the others, among the coding units 1320a to 1320c.

According to an embodiment, the image decoding apparatus 700 may determine the widths or heights of the coding units 1320a to 1320c by using the coordinate (xa, ya) indicating the location of the top left sample 1330a of the upper coding unit 1320a, the coordinate (xb, yb) indicating the location of the top left sample 1330b of the middle coding unit 1320b, and the coordinate (xc, yc) indicating the location of the top left sample 1330c of the lower coding unit 1320c. The image decoding apparatus 700 may determine the sizes of the coding units 1320a to 1320c by using the coordinates (xa, ya), (xb, yb), and (xc, yc) indicating the locations of the coding units 1320a to 1320c.

According to an embodiment, the image decoding apparatus 700 may determine the width of the upper coding unit 1320a to be xb-xa and determine the height thereof to be yb-ya. According to an embodiment, the image decoding apparatus 700 may determine the width of the middle coding unit 1320b to be xc-xb and determine the height thereof to be yc-yb. According to an embodiment, the image decoding apparatus 700 may determine the width or height of the lower coding unit 1320c by using the width or height of the current coding unit 1300 or the widths or heights of the upper and middle coding units 1320a and 1320b. The image decoding apparatus 700 may determine a coding unit, which has a size different from that of the others, based on the determined widths and heights of the coding units 1320a to 1320c. Referring to FIG. 13, the image decoding apparatus 700 may determine the middle coding unit 1320b, which has a size different from the size of the upper and lower coding units 1320a and 1320c, as the coding unit of the predetermined location. However, the above-described method, performed by the image decoding apparatus 700, of determining a coding unit having a size different from the size of the other coding units merely corresponds to an example of determining a coding unit of a predetermined location by using the sizes of coding units, which are determined based on coordinates of samples, and thus various methods of determining a coding unit of a predetermined location by comparing the sizes of coding units, which are determined based on coordinates of predetermined samples may be used.

However, locations of samples considered to determine locations of coding units are not limited to the above-described top left locations, and information about arbitrary locations of samples included in the coding units may be used.

According to an embodiment, the image decoding apparatus 700 may select a coding unit of a predetermined location among an odd number of coding units determined by partitioning the current coding unit, considering the shape of the current coding unit. For example, when the current coding unit has a non-square shape, a width of which is longer than a height, the image decoding apparatus 700 may determine the coding unit of the predetermined location in a horizontal direction. That is, the image decoding apparatus 700 may determine one of coding units of different locations in a horizontal direction and put a restriction on the coding unit. When the current coding unit has a non-square shape, a height of which is longer than a width, the image decoding apparatus 700 may determine the coding unit of the predetermined location in a vertical direction. That is, the image decoding apparatus 700 may determine one of coding units of different locations in a vertical direction and put a restriction on the coding unit.

According to an embodiment, the image decoding apparatus 700 may use information indicating locations of an even number of coding units, to determine the coding unit of the predetermined location among the even number of coding units. The image decoding apparatus 700 may determine an even number of coding units by partitioning the current coding unit, and determine the coding unit of the predetermined location by using the information about the locations of the even number of coding units. An operation related thereto may correspond to the operation of determining a coding unit of a predetermined location (e.g., a center location) among an odd number of coding units, which has been described in detail above in relation to FIG. 13, and thus a detailed description thereof will not be provided herein.

According to an embodiment, when a non-square current coding unit is partitioned into a plurality of coding units, predetermined information about a coding unit of a predetermined location may be used in a partitioning operation to determine the coding unit of the predetermined location among the plurality of coding units. For example, the image decoding apparatus 700 may use at least one of block shape information and partitioning method information, which is stored in a sample included in a coding unit of a center location, in a partitioning operation to determine the coding unit of the center location among the plurality of coding units determined by partitioning the current coding unit.

Referring to FIG. 13, the image decoding apparatus 700 may partition the current coding unit 1300 into a plurality of coding units 1320a to 1320c based on at least one of the block shape information and the partitioning method information, and determine a coding unit 1320b of a center location among the plurality of the coding units 1320a to 1320c. Furthermore, the image decoding apparatus 700 may determine the coding unit 1320b of the center location considering a location from which at least one of the block shape information and the partitioning method information is obtained. That is, at least one of the block shape information and the partitioning method information of the current coding unit 1300 may be obtained from the sample 1340 of a center location of the current coding unit 1300 and, when the current coding unit 1300 is partitioned into the plurality of coding units 1320a to 1320c based on at least one of the block shape information and the partitioning method information, the coding unit 1320b including the sample 1340 may be determined as the coding unit of the center location. However, information used to determine the coding unit of the center location is not limited to at least one of the block shape information and the partitioning method information, and various types of information may be used to determine the coding unit of the center location.

According to an embodiment, predetermined information for identifying the coding unit of the predetermined location may be obtained from a predetermined sample included in a coding unit to be determined. Referring to FIG. 13, the image decoding apparatus 700 may use at least one of the block shape information and the partitioning method information, which is obtained from a sample of a predetermined location in the current coding unit 1300 (e.g., a sample of a center location of the current coding unit 1300) to determine a coding unit of a predetermined location among the plurality of the coding units 1320a to 1320c determined by partitioning the current coding unit 1300 (e.g., a coding unit of a center location among a plurality of partitioned coding units). That is, the image decoding apparatus 700 may determine the sample of the predetermined location considering a block shape of the current coding unit 1300, determine the coding unit 1320b including a sample, from which predetermined information (e.g., at least one of the block shape information and the partitioning method information) may be obtained, among the plurality of coding units 1320a to 1320c determined by partitioning the current coding unit 1300, and put a predetermined restriction on the coding unit 1320b. Referring to FIG. 13, according to an embodiment, the image decoding apparatus 700 may determine the sample 1340 of the center location of the current coding unit 1300 as the sample from which the predetermined information may be obtained, and put a predetermined restriction on the coding unit 1320b including the sample 1340, in a decoding operation. However, the location of the sample from which the predetermined information may be obtained is not limited to the above-described location, and may include arbitrary locations of samples included in the coding unit 1320b to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the image decoding apparatus 700 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 700 may determine one of samples adjacent to a boundary for dividing a long side of the current coding unit in half, as the sample from which the predetermined information may be obtained.

According to an embodiment, when the current coding unit is partitioned into a plurality of coding units, the image decoding apparatus 700 may use at least one of the block shape information and the partitioning method information to determine a coding unit of a predetermined location among the plurality of coding units. According to an embodiment, the image decoding apparatus 700 may obtain at least one of the block shape information and the partitioning method information from a sample of a predetermined location in a coding unit, and partition the plurality of coding units, which are generated by partitioning the current coding unit, by using at least one of the partitioning method information and the block shape information, which is obtained from the sample of the predetermined location in each of the plurality of coding units. That is, a coding unit may be recursively partitioned based on at least one of the block shape information and the partitioning method information, which is obtained from the sample of the predetermined location in each coding unit. An operation of recursively partitioning a coding unit has been described above in relation to FIG. 12, and thus a detailed description thereof will not be provided herein.

According to an embodiment, the image decoding apparatus 700 may determine one or more coding units by partitioning the current coding unit, and determine an order of decoding the one or more coding units, based on a predetermined block (e.g., the current coding unit).

Figure 14:
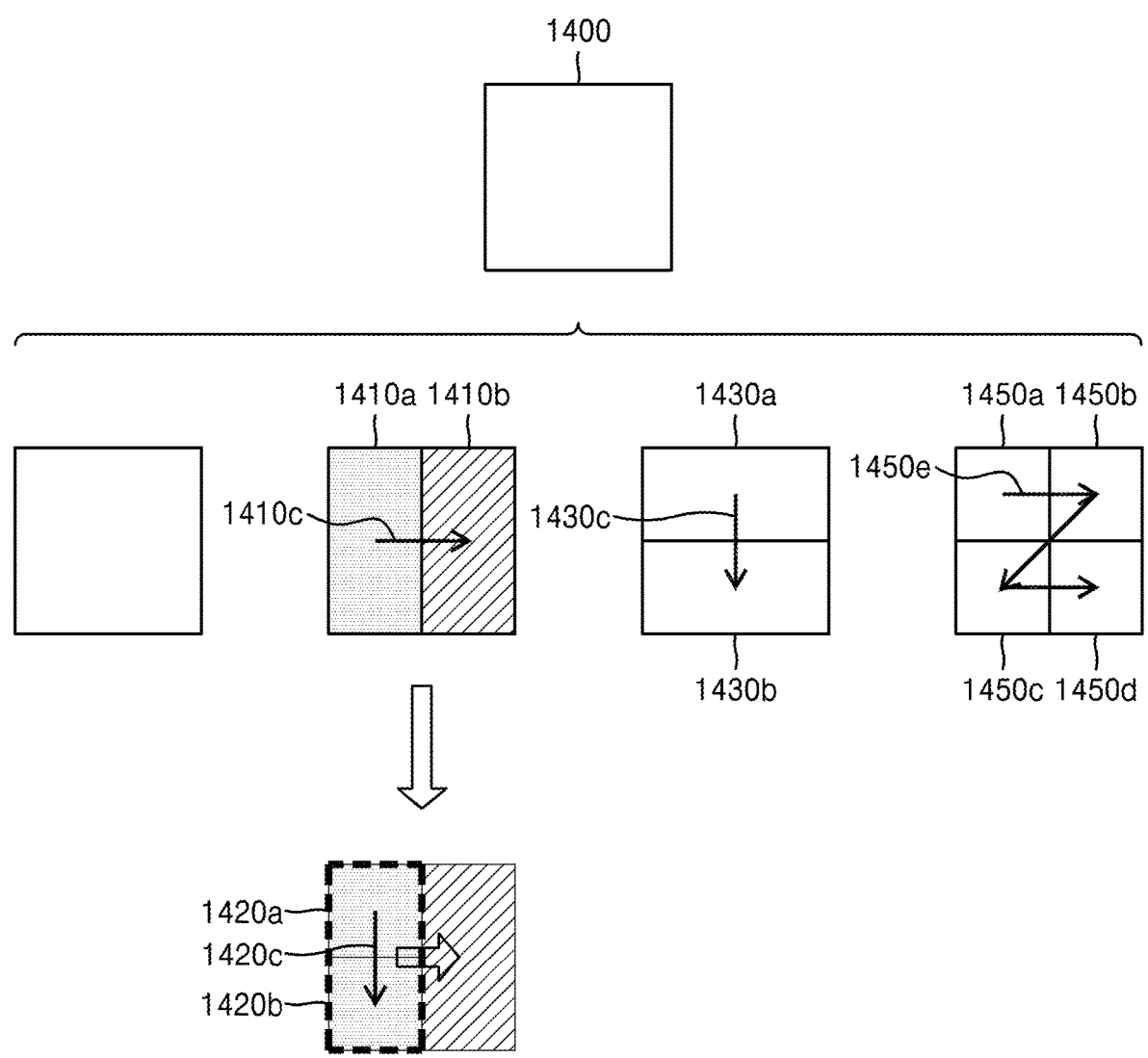
FIG. 14 illustrates a processing order of a plurality of coding units determined by partitioning a current coding unit, according to an embodiment.

FIG. 14 illustrates a processing order of a plurality of coding units determined by partitioning a current coding unit by the image decoding apparatus 700, according to an embodiment.

According to an embodiment, the image decoding apparatus 700 may determine second coding units 1410a and 1410b by partitioning a first coding unit 1400 in a vertical direction, determine second coding units 1430a and 1430b by partitioning the first coding unit 1400 in a horizontal direction, or determine second coding units 1450a to 1450d by partitioning the first coding unit 1400 in vertical and horizontal directions based on block shape information and partitioning method information.

Referring to FIG. 14, the image decoding apparatus 700 may determine to process the second coding units 1410a and 1410b, which are determined by partitioning the first coding unit 1400 in a vertical direction, in a horizontal direction order 1410c. The image decoding apparatus 700 may determine to process the second coding units 1430a and 1430b, which are determined by partitioning the first coding unit 1400 in a horizontal direction, in a vertical direction order 1430c. The image decoding apparatus 700 may determine to process the second coding units 1450a to 1450d, which are determined by partitioning the first coding unit 1400 in vertical and horizontal directions, in a predetermined order for processing coding units of a row and then processing coding units of a next row (e.g., in a raster scan order or Z-scan order 1450e).

According to an embodiment, the image decoding apparatus 700 may recursively partition coding units. Referring to FIG. 14, the image decoding apparatus 700 may determine a plurality of coding units 1410a and 1410b, 1430a and 1430b, or 1450a to 1450d by partitioning the first coding unit 1400, and recursively partition each of the determined plurality of coding units 1410a and 1410b, 1430a and 1430b, or 1450a to 1450d. A partitioning method of the plurality of coding units 1410a and 1410b, 1430a and 1430b, or 1450a to 1450d may correspond to a partitioning method of the first coding unit 1400. As such, each of the plurality of coding units 1410a and 1410b, 1430a and 1430b, or 1450a to 1450d may be independently partitioned into a plurality of coding units. Referring to FIG. 14, the image decoding apparatus 700 may determine the second coding units 1410a and 1410b by partitioning the first coding unit 1400 in a vertical direction, and determine to independently partition or not to partition the second coding units 1410a and 1410b.

According to an embodiment, the image decoding apparatus 700 may determine third coding units 1420a and 1420b by partitioning the left second coding unit 1410a in a horizontal direction, and may not partition the right second coding unit 1410b.

According to an embodiment, a processing order of coding units may be determined based on an operation of partitioning a coding unit. In other words, a processing order of partitioned coding units may be determined based on a processing order of coding units immediately before being partitioned. The image decoding apparatus 700 may determine a processing order of the third coding units 1420a and 1420b determined by partitioning the left second coding unit 1410a, independently of the right second coding unit 1410b. Since the third coding units 1420a and 1420b are determined by partitioning the left second coding unit 1410a in a horizontal direction, the third coding units 1420a and 1420b may be processed in a vertical direction order 1420c. Since the left and right second coding units 1410a and 1410b are processed in the horizontal direction order 1410c, the right second coding unit 1410b may be processed after the third coding units 1420a and 1420b included in the left second coding unit 1410a are processed in the vertical direction order 1420c. An operation of determining a processing order of coding units based on a coding unit before being partitioned is not limited to the above-described example, and various methods may be used to independently process coding units, which are partitioned and determined to various shapes, in a predetermined order.

Figure 15:
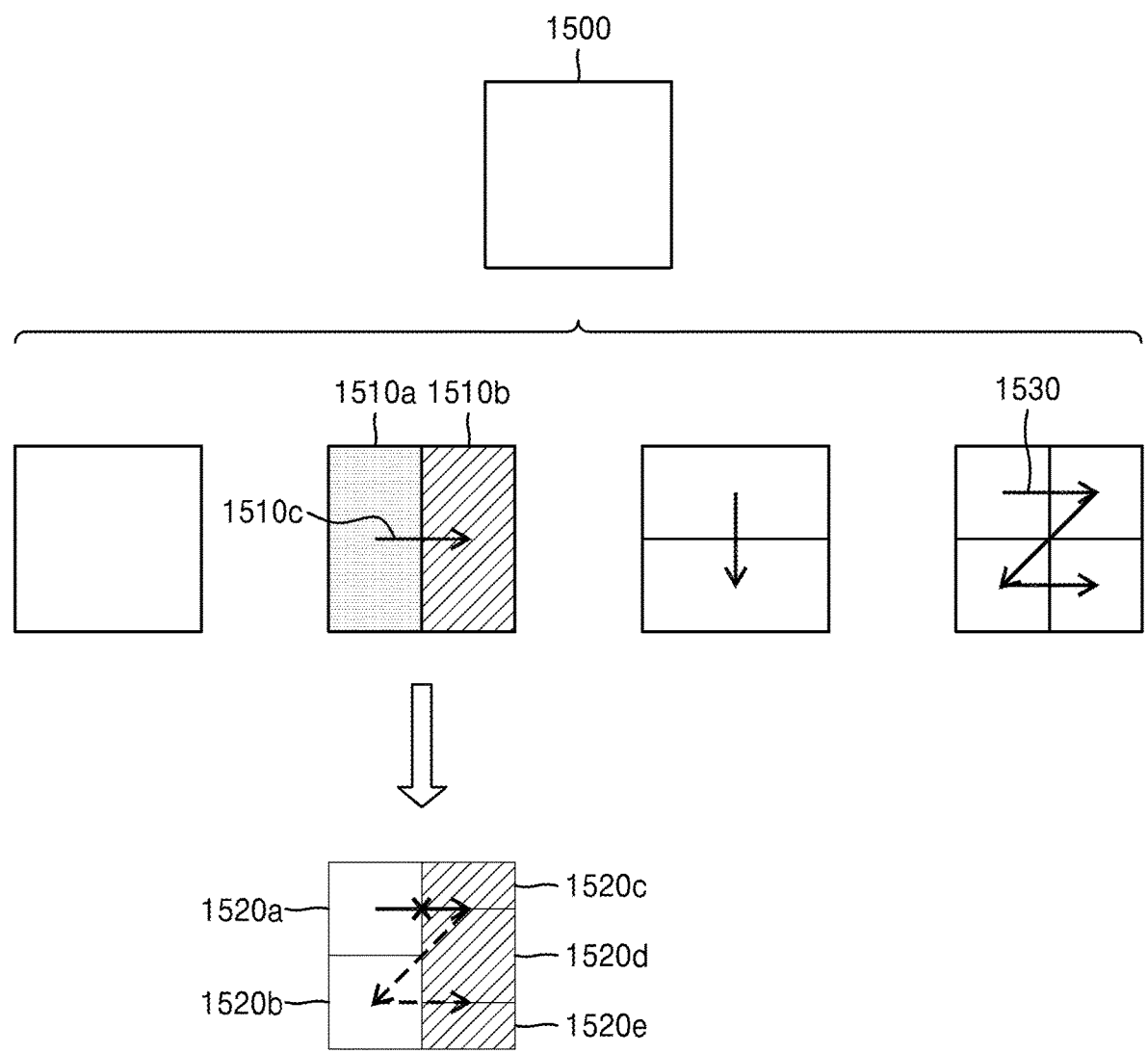
FIG. 15 illustrates an operation of determining that a current coding unit is partitioned into an odd number of coding units, when the coding units are not processable in a predetermined order, according to an embodiment.

FIG. 15 illustrates an operation, performed by the image decoding apparatus 700, of determining that a current coding unit is partitioned into an odd number of coding units, when the coding units are not processable in a predetermined order, according to an embodiment.

According to an embodiment, the image decoding apparatus 700 may determine whether the current coding unit is partitioned into an odd number of coding units, based on obtained block shape information and partitioning method information. Referring to FIG. 15, a square first coding unit 1500 may be partitioned into non-square second coding units 1510a and 1510b, and the second coding units 1510a and 1510b may be independently partitioned into third coding units 1520a and 1520b, and 1520c to 1520e. According to an embodiment, the image decoding apparatus 700 may determine a plurality of third coding units 1520a and 1520b by partitioning the left second coding unit 1510a in a horizontal direction, and partition the right second coding unit 1510b into an odd number of third coding units 1520c to 1520e.

According to an embodiment, the image decoding apparatus 700 may determine whether any coding unit is partitioned into an odd number of coding units, by deciding whether the third coding units 1520a and 1520b, and 1520c to 1520e are processable in a predetermined order. Referring to FIG. 15, the image decoding apparatus 700 may determine the third coding units 1520a and 1520b, and 1520c to 1520e by recursively partitioning the first coding unit 1500. The image decoding apparatus 700 may determine whether any of the first coding unit 1500, the second coding units 1510a and 1510b, and the third coding units 1520a and 1520b, and 1520c to 1520e is partitioned into an odd number of coding units, based on at least one of the block shape information and the partitioning method information. For example, the right second coding unit 1510b may be partitioned into an odd number of third coding units 1520c to 1520e. A processing order of a plurality of coding units included in the first coding unit 1500 may be a predetermined order (e.g., a Z-scan order 1530), and the image decoding apparatus 700 may decide whether the third coding units 1520c to 1520e, which are determined by partitioning the right second coding unit 1510b into an odd number of coding units, satisfy a condition for processing in the predetermined order.

According to an embodiment, the image decoding apparatus 700 may determine whether the third coding units 1520a and 1520b, and 1520c to 1520e included in the first coding unit 1500 satisfy the condition for processing in the predetermined order, and the condition relates to whether at least one of a width and height of the second coding units 1510a and 1510b is divided in half along a boundary of the third coding units 1520a and 1520b, and 1520c to 1520e. For example, the third coding units 1520a and 1520b determined by dividing the height of the non-square left second coding unit 1510a in half satisfy the condition. However, since boundaries of the third coding units 1520c to 1520e determined by partitioning the right second coding unit 1510b into three coding units do not divide the width or height of the right second coding unit 1510b in half, it may be determined that the third coding units 1520c to 1520e do not satisfy the condition. When the condition is not satisfied as described above, the image decoding apparatus 700 may decide disconnection of a scan order, and determine that the right second coding unit 1510b is partitioned into an odd number of coding units, based on the result of decision. According to an embodiment, when a coding unit is partitioned into an odd number of coding units, the image decoding apparatus 700 may put a predetermined restriction on a coding unit of a predetermined location among the partitioned coding units. The restriction or the predetermined location has been described above in relation to various embodiments, and thus a detailed description thereof will not be provided herein.

Figure 16:
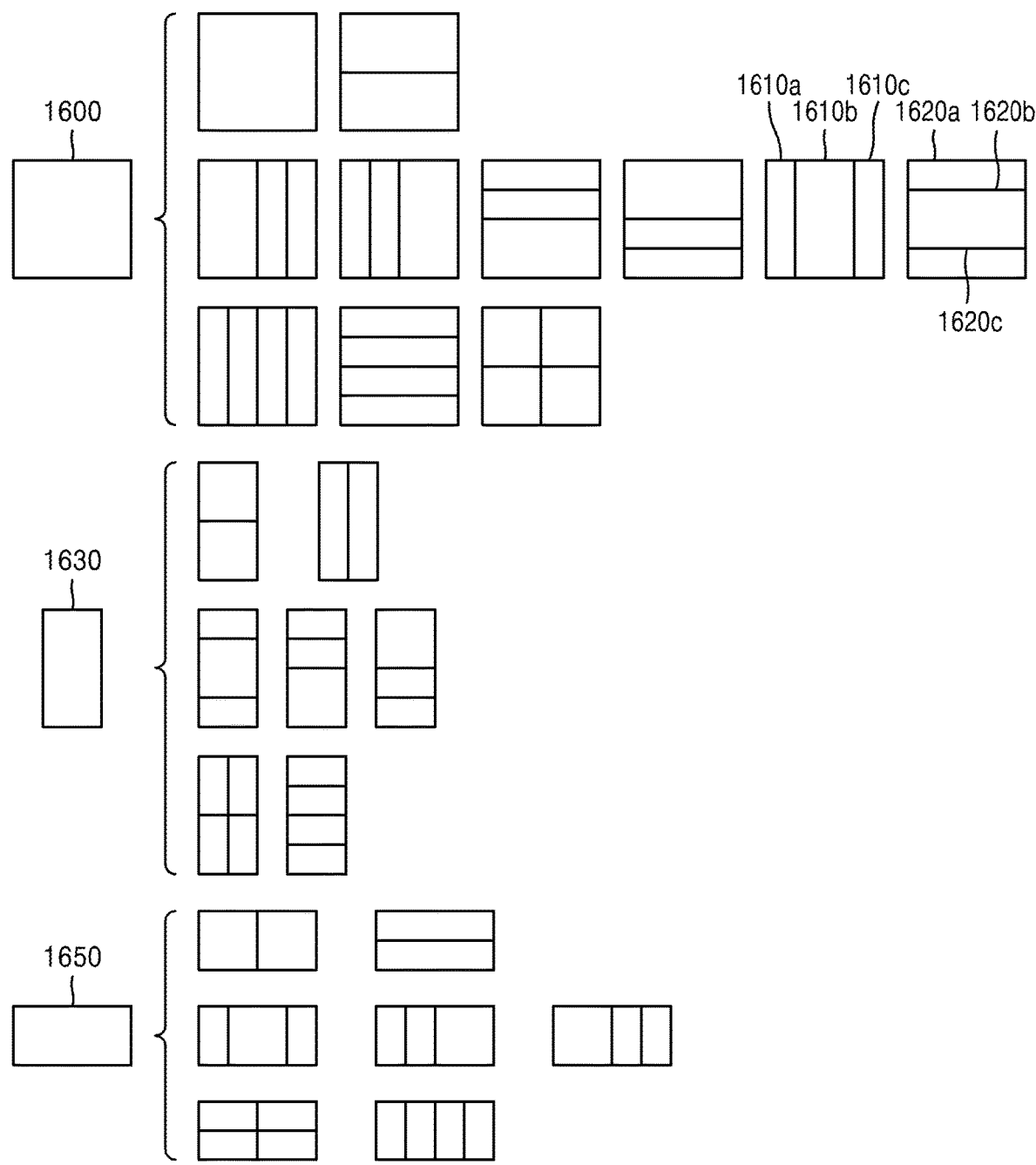
FIG. 16 illustrates an operation of determining one or more coding units by partitioning a first coding unit, according to an embodiment.

FIG. 16 illustrates an operation, performed by the image decoding apparatus 700, of determining one or more coding units by partitioning a first coding unit 1600, according to an embodiment. According to an embodiment, the image decoding apparatus 700 may partition the first coding unit 1600 based on at least one of block shape information and partitioning method information. The square first coding unit 1600 may be partitioned into four square coding units or into a plurality of non-square coding units. For example, referring to FIG. 16, when the block shape information indicates that the first coding unit 1600 has a square shape and the partitioning method information indicates to partition the first coding unit 1600 into non-square coding units, the image decoding apparatus 700 may partition the first coding unit 1600 into a plurality of non-square coding units. Specifically, when the partitioning method information indicates to determine an odd number of coding units by partitioning the first coding unit 1600 in a horizontal or vertical direction, the image decoding apparatus 700 may partition the square first coding unit 1600 into an odd number of coding units, e.g., second coding units 1610*a* to 1610*c* determined by partitioning the square first coding unit 1600 in a vertical direction or second coding units 1620*a* to 1620*c* determined by partitioning the square first coding unit 1600 in a horizontal direction.

According to an embodiment, the image decoding apparatus 700 may determine whether the second coding units 1610*a* to 1610*c*, or 1620*a* to 1620*c* included in the first coding unit 1600 satisfy a condition for processing in a predetermined order, and the condition relates to whether at least one of a width and height of the first coding unit 1600 is divided in half along a boundary of the second coding units 1610*a* to 1610*c*, or 1620*a* to 1620*c*. Referring to FIG. 16, since boundaries of the second coding units 1610*a* to 1610*c* determined by partitioning the square first coding unit 1600 in a vertical direction do not divide the width of the first coding unit 1600 in half, it may be determined that the first coding unit 1600 does not satisfy the condition for processing in the predetermined order. In addition, since boundaries of the second coding units 1620*a* to 1620*c* determined by partitioning the square first coding unit 1600 in a horizontal direction do not divide the height of the first coding unit 1600 in half, it may be determined that the first coding unit 1600 does not satisfy the condition for processing in the predetermined order. When the condition is not satisfied as described above, the image decoding apparatus 700 may decide disconnection of a scan order, and determine that the first coding unit 1600 is partitioned into an odd number of coding units, based on the result of decision. According to an embodiment, when a coding unit is partitioned into an odd number of coding units, the image decoding apparatus 700 may put a predetermined restriction on a coding unit of a predetermined location among the partitioned coding units. The restriction or the predetermined location has been described above in relation to various embodiments, and thus a detailed description thereof will not be provided herein.

According to an embodiment, the image decoding apparatus 700 may determine various-shaped coding units by partitioning a first coding unit.

Referring to FIG. 16, the image decoding apparatus 700 may partition the square first coding unit 1600 or a non-square first coding unit 1630 or 1650 into various-shaped coding units.

Figure 17:
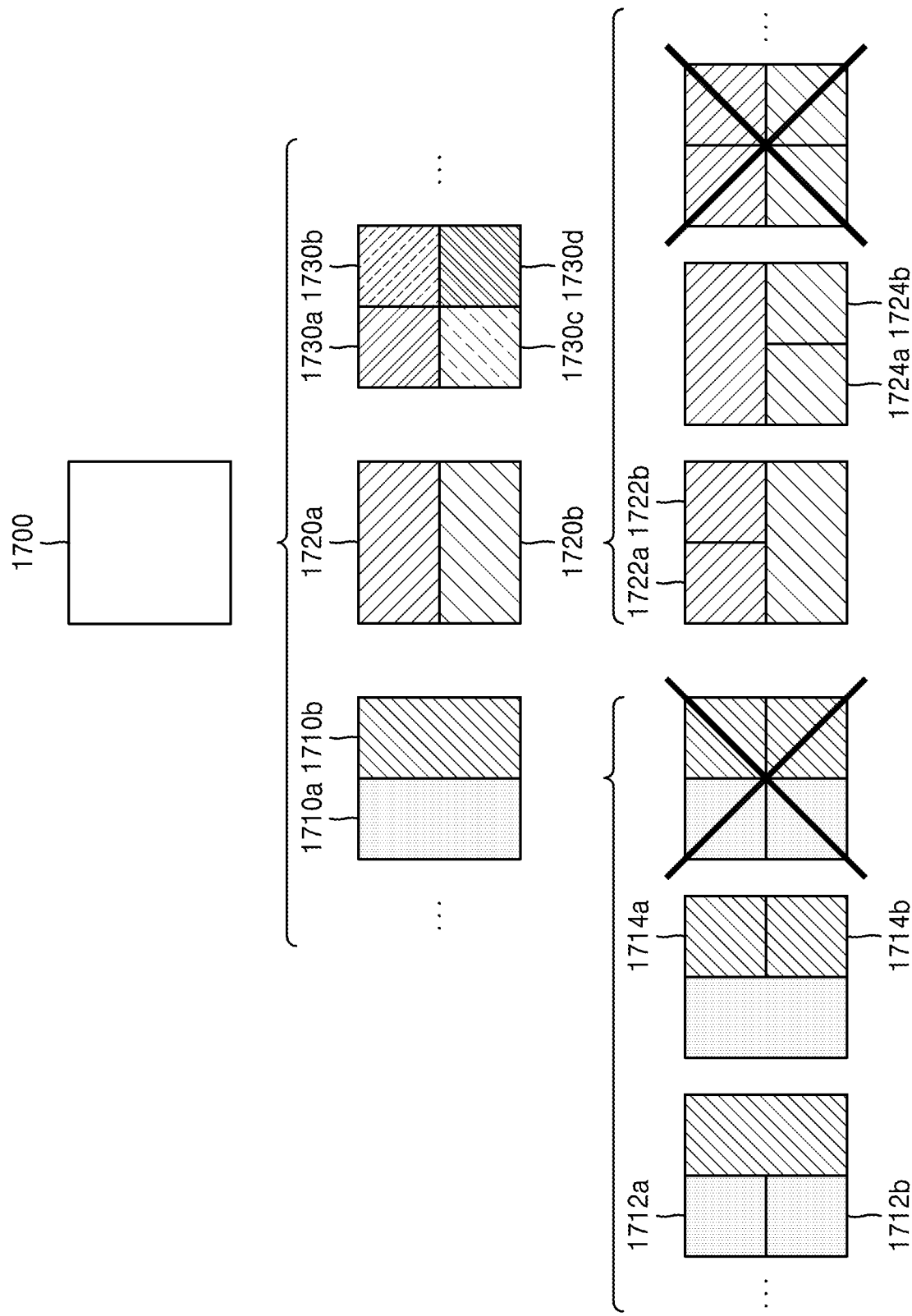
FIG. 17 shows that partitioning methods for determining non-square second coding units by partitioning a first coding unit are restricted when the second coding units satisfy a predetermined condition, according to an embodiment.

FIG. 17 shows that partitioning methods for determining non-square second coding units by partitioning a first coding unit 1700 are restricted by the image decoding apparatus 700 when the second coding units satisfy a predetermined condition, according to an embodiment.

According to an embodiment, the image decoding apparatus 700 may determine to partition the square first coding unit 1700 into non-square second coding units 1710*a* and 1710*b*, or 1720*a* and 1720*b* based on at least one of block shape information and partitioning method information. The second coding units 1710*a* and 1710*b*, or 1720*a* and 1720*b* may be independently partitioned. As such, the image decoding apparatus 700 may determine to or not to partition the first coding unit 1700 into a plurality of coding units based on at least one of the block shape information and the partitioning method information of each of the second coding units 1710*a* and 1710*b*, or 1720*a* and 1720*b*. According to an embodiment, the image decoding apparatus 700 may determine third coding units 1712*a* and 1712*b* by partitioning the non-square left second coding unit 1710*a*, which is determined by partitioning the first coding unit 1700 in a vertical direction, in a horizontal direction. However, when the left second coding unit 1710*a* is partitioned in a horizontal direction, the image decoding apparatus 700 may restrict the right second coding unit 1710*b* not to be partitioned in a horizontal direction in which the left second coding unit 1710*a* is partitioned. If third coding units 1714*a* and 1714*b* are determined by also partitioning the right second coding unit 1710*b* in a horizontal direction, since the left and right second coding units 1710*a* and 1710*b* are independently partitioned in a horizontal direction, the third coding units 1712*a* and 1712*b*, and 1714*a* and 1714*b* may be determined. However, this case serves equally as a case in which the image decoding apparatus 700 partitions the first coding unit 1700 into four square second coding units 1730*a* to 1730*d* based on at least one of the block shape information and the partitioning method information, and may be inefficient in terms of image decoding.

According to an embodiment, the image decoding apparatus 700 may determine third coding units 1722*a* and 1722*b*, or 1724*a* and 1724*b* by partitioning the non-square second coding unit 1720*a* or 1720*b*, which is determined by partitioning the first coding unit 1700 in a horizontal direction, in a vertical direction. However, when a second coding unit (e.g., the upper second coding unit 1720*a*) is partitioned in a vertical direction, due to the above-described reason, the image decoding apparatus 700 may restrict the other second coding unit (e.g., the lower second coding unit 1720*b*) not to be partitioned in a vertical direction in which the upper second coding unit 1720*a* is partitioned.

Figure 18:
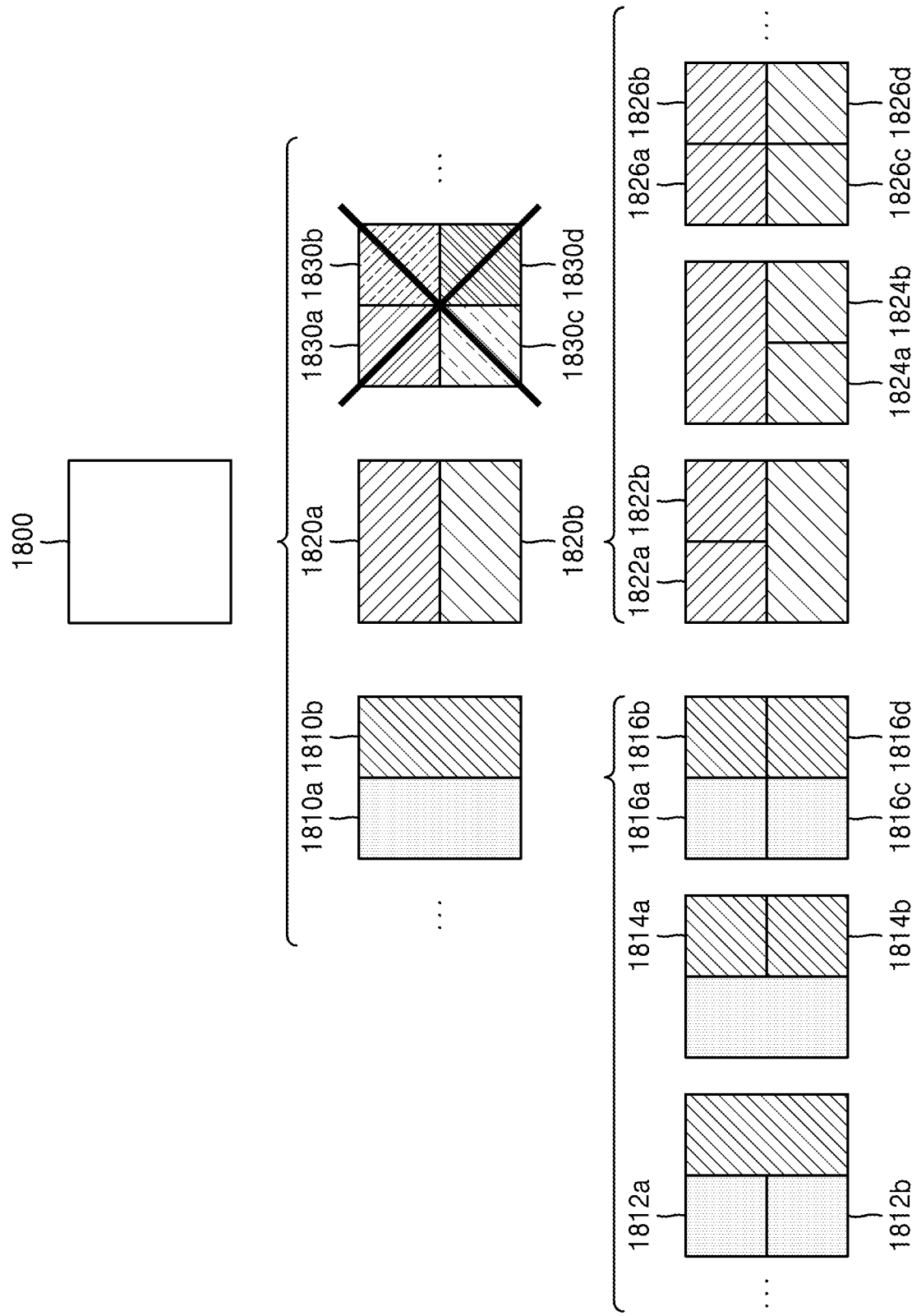
FIG. 18 illustrates an operation of partitioning a square coding unit when partitioning method information indicates not to partition the square coding unit into four square coding units, according to an embodiment.

FIG. 18 illustrates an operation, performed by the image decoding apparatus 700, of partitioning a square coding unit when partitioning method information indicates not to partition the square coding unit into four square coding units, according to an embodiment.

According to an embodiment, the image decoding apparatus 700 may determine second coding units 1810*a* and 1810*b*, or 1820*a* and 1820*b* by partitioning a first coding unit 1800 based on at least one of block shape information and partitioning method information. The partitioning method information may include information about various methods of partitioning a coding unit but, in some times, the information about various partitioning methods may not include information for partitioning a coding unit into four square coding units. According to this partitioning method information, the image decoding apparatus 700 may not partition the first square coding unit 1800 into four square second coding units 1830*a* to 1830*d*. The image decoding apparatus 700 may determine the non-square second coding units 1810*a* and 1810*b*, or 1820*a* and 1820*b* based on the partitioning method information.

According to an embodiment, the image decoding apparatus 700 may independently partition the non-square second coding units 1810*a* and 1810*b*, or 1820*a* and 1820*b*. Each of the second coding units 1810*a* and 1810*b*, or 1820*a* and 1820*b* may be recursively partitioned in a predetermined order, and this may correspond to a partitioning method of the first coding unit 1800 based on at least one of the block shape information and the partitioning method information.

For example, the image decoding apparatus 700 may determine square third coding units 1812*a* and 1812*b* by partitioning the left second coding unit 1810a in a horizontal direction, and determine square third coding units 1814a and 1814b by partitioning the right second coding unit 1810b in a horizontal direction. Furthermore, the image decoding apparatus 700 may determine square third coding units 1816a to 1816d by partitioning both of the left and right second coding units 1810a and 1810b in a horizontal direction. In this case, coding units having the same shape as the four square second coding units 1830a to 1830d partitioned from the first coding unit 1800 may be determined.

As another example, the image decoding apparatus 700 may determine square third coding units 1822a and 1822b by partitioning the upper second coding unit 1820a in a vertical direction, and determine square third coding units 1824a and 1824b by partitioning the lower second coding unit 1820b in a vertical direction. Furthermore, the image decoding apparatus 700 may determine square third coding units 1826a to 1826d by partitioning both of the upper and lower second coding units 1820a and 1820b in a vertical direction. In this case, coding units having the same shape as the four square second coding units 1830a to 1830d partitioned from the first coding unit 1800 may be determined.

Figure 19:
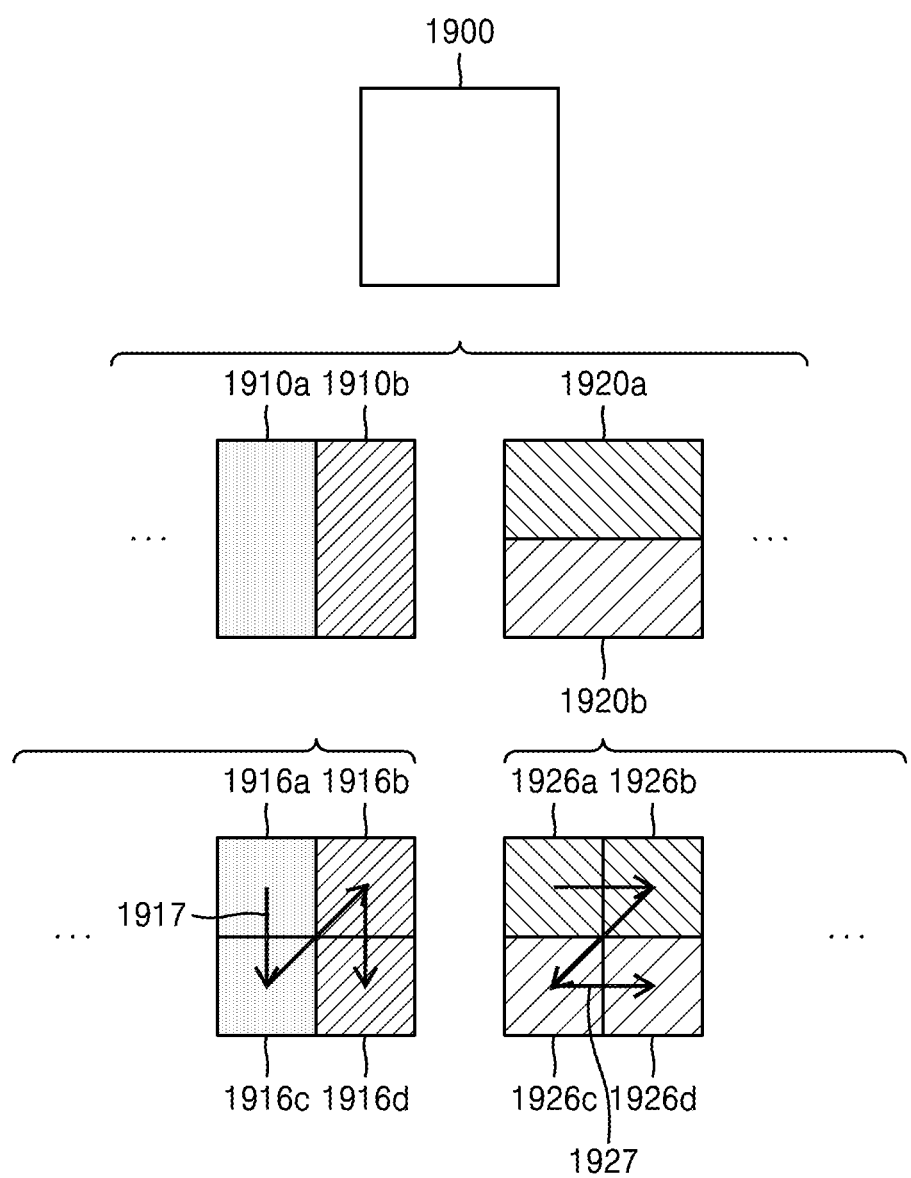
FIG. 19 shows that a processing order of a plurality of coding units is variable depending on an operation of partitioning a coding unit, according to an embodiment.

FIG. 19 shows that a processing order of a plurality of coding units is variable depending on an operation of partitioning a coding unit, according to an embodiment.

According to an embodiment, the image decoding apparatus 700 may partition a first coding unit 1900 based on block shape information and partitioning method information. When the block shape information indicates a square shape and the partitioning method information indicates to partition the first coding unit 1900 in at least one of horizontal and vertical directions, the image decoding apparatus 700 may determine second coding units 1910a and 1910b, or 1920a and 1920b by partitioning the first coding unit 1900. Referring to FIG. 19, the non-square second coding units 1910a and 1910b, or 1920a and 1920b determined by partitioning the first coding unit 1900 in only a horizontal or vertical direction may be independently partitioned based on the block shape information and the partitioning method information of each coding unit. For example, the image decoding apparatus 700 may determine third coding units 1916a to 1916d by partitioning the second coding units 1910a and 1910b, which are generated by partitioning the first coding unit 1900 in a vertical direction, in a horizontal direction, and determine third coding units 1926a to 1926d by partitioning the second coding units 1920a and 1920b, which are generated by partitioning the first coding unit 1900 in a horizontal direction, in a vertical direction. An operation of partitioning the second coding units 1910a and 1910b, or 1920a and 1920b has been described above in relation to FIG. 17, and thus a detailed description thereof will not be provided herein.

According to an embodiment, the image decoding apparatus 700 may process coding units in a predetermined order. An operation of processing coding units in a predetermined order has been described above in relation to FIG. 14, and thus a detailed description thereof will not be provided herein. Referring to FIG. 19, the image decoding apparatus 700 may determine the four square third coding units 1916a to 1916d, or 1926a to 1926d by partitioning the square first coding unit 1900. According to an embodiment, the image decoding apparatus 700 may determine a processing order of the third coding units 1916a to 1916d, or 1926a to 1926d based on a partitioning method of the first coding unit 1900.

According to an embodiment, the image decoding apparatus 700 may determine the third coding units 1916a to 1916d by partitioning the second coding units 1910a and 1910b generated by partitioning the first coding unit 1900 in a vertical direction, in a horizontal direction, and process the third coding units 1916a to 1916d in a processing order 1917 for initially processing the third coding units 1916a and 1916c which are included in the left second coding unit 1910a, in a vertical direction and then processing the third coding unit 1916b and 1916d, which are included in the right second coding unit 1910b, in a vertical direction.

According to an embodiment, the image decoding apparatus 700 may determine the third coding units 1926a to 1926d by partitioning the second coding units 1920a and 1920b generated by partitioning the first coding unit 1900 in a horizontal direction, in a vertical direction, and process the third coding units 1926a to 1926d in a processing order 1927 for initially processing the third coding units 1926a and 1926b, which are included in the upper second coding unit 1920a, in a horizontal direction and then processing the third coding unit 1926c and 1926d, which are included in the lower second coding unit 1920b, in a horizontal direction.

Referring to FIG. 19, the square third coding units 1916a to 1916d, or 1926a to 1926d may be determined by partitioning the second coding units 1910a and 1910b, or 1920a and 1920b. Although the second coding units 1910a and 1910b are determined by partitioning the first coding unit 1900 in a vertical direction differently from the second coding units 1920a and 1920b which are determined by partitioning the first coding unit 1900 in a horizontal direction, the third coding units 1916a to 1916d, and 1926a to 1926d partitioned therefrom eventually show same-shaped coding units partitioned from the first coding unit 1900. As such, by recursively partitioning a coding unit in different manners based on at least one of the block shape information and the partitioning method information, the image decoding apparatus 700 may process a plurality of coding units in different orders even when the coding units are eventually determined to the same shape.

FIG. 20 illustrates an operation of determining a depth of a coding unit as the shape and size of the coding unit varies when a plurality of coding units are determined by recursively partitioning the coding unit, according to an embodiment.

According to an embodiment, the image decoding apparatus 700 may determine the depth of the coding unit based on a predetermined criterion. For example, the predetermined criterion may be the length of a long side of the coding unit. When the length of a long side of a coding unit before being partitioned is $2^n$ times (n>0) the length of a long side of a partitioned current coding unit, the image decoding apparatus 700 may determine that a depth of the current coding unit is increased from a depth of the coding unit before being partitioned, by n. In the following description, a coding unit having an increased depth is expressed as a coding unit of a deeper depth.

Referring to FIG. 20, according to an embodiment, the image decoding apparatus 700 may determine a second coding unit 2002 and a third coding unit 2004 of deeper depths by partitioning a square first coding unit 2000 based on block shape information indicating a square shape (for example, the block shape information may be expressed as '0: SQUARE'). Assuming that the size of the square first coding unit 2000 is 2N×2N, the second coding unit 2002 determined by reducing a width and height of the first coding unit 2000 to $\frac{1}{2}^1$ may have a size of N×N. Furthermore, the third coding unit 2004 determined by reducing a width and height of the second coding unit 2002 to ½ may have a size of N/2×N/2. In this case, a width and height of the third coding unit 2004 are $\frac{1}{2}^2$ times those of the first coding unit

2000. When a depth of the first coding unit 2000 is D, a depth of the second coding unit 2002, the width and height of which are $½^1$ times those of the first coding unit 2000, may be D+1, and a depth of the third coding unit 2004, the width and height of which are $½^2$ times those of the first coding unit 2000, may be D+2.

According to an embodiment, the image decoding apparatus 700 may determine a second coding unit 2012 or 2022 and a third coding unit 2014 or 2024 of deeper depths by partitioning a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 700 may determine a second coding unit 2002, 2012, or 2022 by dividing at least one of a width and height of the first coding unit 2010 having a size of N×2N. That is, the image decoding apparatus 700 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

According to an embodiment, the image decoding apparatus 700 may determine the second coding unit 2002, 2012, or 2022 by dividing at least one of a width and height of the first coding unit 2020 having a size of 2N×N. That is, the image decoding apparatus 700 may determine the second coding unit 2002 having a size of N×N or the second coding unit 2012 having a size of N/2×N by partitioning the first coding unit 2020 in a vertical direction, or determine the second coding unit 2022 having a size of N×N/2 by partitioning the first coding unit 2020 in horizontal and vertical directions.

According to an embodiment, the image decoding apparatus 700 may determine a third coding unit 2004, 2014, or 2024 by dividing at least one of a width and height of the second coding unit 2002 having a size of N×N. That is, the image decoding apparatus 700 may determine the third coding unit 2004 having a size of N/2×N/2, the third coding unit 2014 having a size of N/$2^2$×N/2, or the third coding unit 2024 having a size of N/2×N/$2^2$ by partitioning the second coding unit 2002 in vertical and horizontal directions.

According to an embodiment, the image decoding apparatus 700 may determine the third coding unit 2004, 2014, or 2024 by dividing at least one of a width and height of the second coding unit 2012 having a size of N/2×N. That is, the image decoding apparatus 700 may determine the third coding unit 2004 having a size of N/2×N/2 or the third coding unit 2024 having a size of N/2×N/$2^2$ by partitioning the second coding unit 2012 in a horizontal direction, or determine the third coding unit 2014 having a size of N/$2^2$×N/2 by partitioning the second coding unit 2012 in vertical and horizontal directions.

According to an embodiment, the image decoding apparatus 700 may determine the third coding unit 2004, 2014, or 2024 by dividing at least one of a width and height of the second coding unit 2022 having a size of N×N/2. That is, the image decoding apparatus 700 may determine the third coding unit 2004 having a size of N/2×N/2 or the third coding unit 2014 having a size of N/$2^2$×N/2 by partitioning the second coding unit 2022 in a vertical direction, or determine the third coding unit 2024 having a size of N/2×N/$2^2$ by partitioning the second coding unit 2022 in vertical and horizontal directions.

According to an embodiment, the image decoding apparatus 700 may partition the square coding unit 2000, 2002, or 2004 in a horizontal or vertical direction. For example, the image decoding apparatus 700 may determine the first coding unit 2010 having a size of N×2N by partitioning the first coding unit 2000 having a size of 2N×2N in a vertical direction, or determine the first coding unit 2020 having a size of 2N×N by partitioning the first coding unit 2000 in a horizontal direction. According to an embodiment, when a depth is determined based on the length of the longest side of a coding unit, a depth of a coding unit determined by partitioning the first coding unit 2000 having a size of 2N×2N in a horizontal or vertical direction may be the same as the depth of the first coding unit 2000.

According to an embodiment, a width and height of the third coding unit 2014 or 2024 may be $½^2$ times those of the first coding unit 2010 or 2020. When a depth of the first coding unit 2010 or 2020 is D, a depth of the second coding unit 2012 or 2022, the width and height of which are ½ times those of the first coding unit 2010 or 2020, may be D+1, and a depth of the third coding unit 2014 or 2024, the width and height of which are $½^2$ times those of the first coding unit 2010 or 2020, may be D+2.

Figure 21:
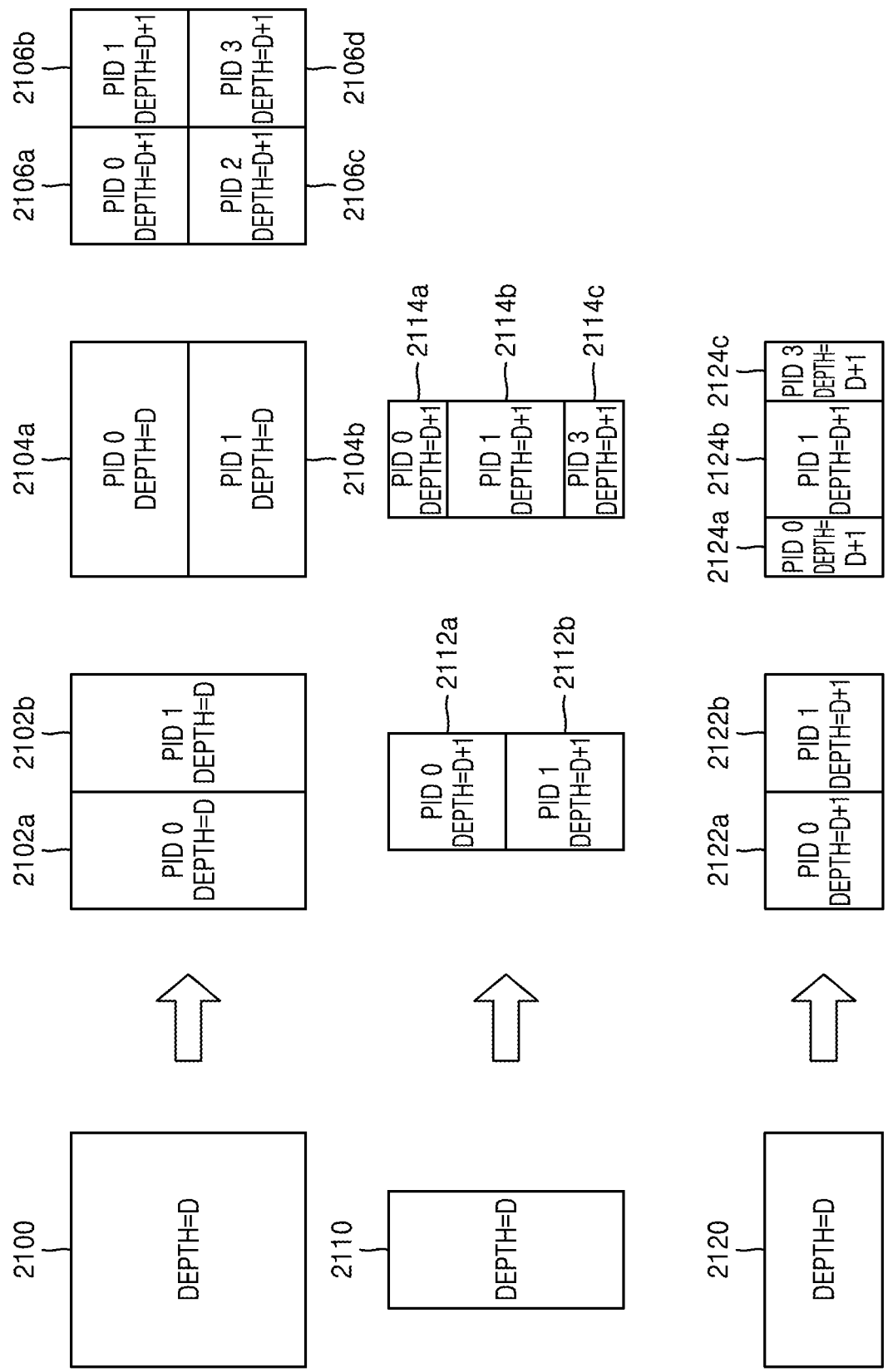
FIG. 21 shows depths of and part indices (PIDs) for identifying coding units, which are determinable based on the shapes and sizes of the coding units, according to an embodiment.

FIG. 21 shows depths of and part indices (PIDs) for identifying coding units, which are determinable based on the shapes and sizes of the coding units, according to an embodiment.

According to an embodiment, the image decoding apparatus 700 may determine various-shaped second coding units by partitioning a square first coding unit 2100. Referring to FIG. 21, the image decoding apparatus 700 may determine second coding units 2102*a* and 2102*b*, 2104*a* and 2104*b*, or 2106*a* to 2106*d* by partitioning the first coding unit 2100 in at least one of vertical and horizontal directions based on partitioning method information. That is, the image decoding apparatus 700 may determine the second coding units 2102*a* and 2102*b*, 2104*a* and 2104*b*, or 2106*a* to 2106*d* based on the partitioning method information of the first coding unit 2100.

According to an embodiment, a depth of the second coding units 2102*a* and 2102*b*, 2104*a* and 2104*b*, or 2106*a* to 2106*d*, which are determined based on the partitioning method information of the square first coding unit 2100, may be determined based on the length of a long side thereof. For example, since the length of a side of the square first coding unit 2100 equals the length of a long side of the non-square second coding units 2102*a* and 2102*b*, or 2104*a* and 2104*b*, the first coding unit 2100 and the non-square second coding units 2102*a* and 2102*b*, or 2104*a* and 2104*b* may have the same depth, e.g., D. However, when the image decoding apparatus 700 partitions the first coding unit 2100 into the four square second coding units 2106*a* to 2106*d* based on the partitioning method information, since the length of a side of the square second coding units 2106*a* to 2106*d* is ½ times the length of a side of the first coding unit 2100, a depth of the second coding units 2106*a* to 2106*d* may be D+1 which is deeper than the depth D of the first coding unit 2100 by 1.

According to an embodiment, the image decoding apparatus 700 may determine a plurality of second coding units 2112*a* and 2112*b*, or 2114*a* to 2114*c* by partitioning a first coding unit 2110, a height of which is longer than a width, in a horizontal direction based on the partitioning method information. According to an embodiment, the image decoding apparatus 700 may determine a plurality of second coding units 2122a and 2122b, or 2124a to 2124c by partitioning a first coding unit 2120, a width of which is longer than a height, in a vertical direction based on the partitioning method information.

According to an embodiment, a depth of the second coding units 2112a and 2112b, 2114a to 2114c, 2122a and 2122b, or 2124a to 2124c, which are determined based on the partitioning method information of the non-square first coding unit 2110 or 2120, may be determined based on the length of a long side thereof. For example, since the length of a side of the square second coding units 2112a and 2112b is ½ times the length of a long side of the first coding unit 2110 having a non-square shape, a height of which is longer than a width, a depth of the square second coding units 2112a and 2112b is D+1 which is deeper than the depth D of the non-square first coding unit 2110 by 1.

Furthermore, the image decoding apparatus 700 may partition the non-square first coding unit 2110 into an odd number of second coding units 2114a to 2114c based on the partitioning method information. The odd number of second coding units 2114a to 2114c may include the non-square second coding units 2114a and 2114c and the square second coding unit 2114b. In this case, since the length of a long side of the non-square second coding units 2114a and 2114c and the length of a side of the square second coding unit 2114b are ½ times the length of a long side of the first coding unit 2110, a depth of the second coding units 2114a to 2114c may be D+1 which is deeper than the depth D of the non-square first coding unit 2110 by 1. The image decoding apparatus 700 may determine depths of coding units partitioned from the first coding unit 2120 having a non-square shape, a width of which is longer than a height, by using the above-described method of determining depths of coding units partitioned from the first coding unit 2110.

According to an embodiment, the image decoding apparatus 700 may determine PIDs for identifying partitioned coding units, based on a size ratio between the coding units when an odd number of partitioned coding units do not have equal sizes. Referring to FIG. 21, a coding unit 2114b of a center location among an odd number of partitioned coding units 2114a to 2114c may have a width equal to that of the other coding units 2114a and 2114c and a height which is two times that of the other coding units 2114a and 2114c. That is, in this case, the coding unit 2114b of the center location may include two of the other coding unit 2114a or 2114c. Therefore, assuming that a PID of the coding unit 2114b of the center location is 1 based on a scan order, a PID of the coding unit 2114c located next to the coding unit 2114b may be increased by 2 and thus may be 3. That is, discontinuity in PID values may be present. According to an embodiment, the image decoding apparatus 700 may determine whether an odd number of partitioned coding units do not have equal sizes, based on whether discontinuity is present in PIDs for identifying the partitioned coding units.

According to an embodiment, the image decoding apparatus 700 may determine whether to use a specific partitioning method, based on PID values for identifying a plurality of coding units determined by partitioning a current coding unit. Referring to FIG. 21, the image decoding apparatus 700 may determine an even number of coding units 2112a and 2112b or an odd number of coding units 2114a to 2114c by partitioning the first coding unit 2110 having a rectangular shape, a height of which is longer than a width. The image decoding apparatus 700 may use PIDs to identify a plurality of coding units. According to an embodiment, the PID may be obtained from a sample of a predetermined location of each coding unit (e.g., a top left sample).

According to an embodiment, the image decoding apparatus 700 may determine a coding unit of a predetermined location among the partitioned coding units, by using the PIDs for identifying the coding units. According to an embodiment, when the partitioning method information of the first coding unit 2110 having a rectangular shape, a height of which is longer than a width, indicates to partition a coding unit into three coding units, the image decoding apparatus 700 may partition the first coding unit 2110 into three coding units 2114a to 2114c. The image decoding apparatus 700 may assign a PID to each of the three coding units 2114a to 2114c. The image decoding apparatus 700 may compare PIDs of an odd number of partitioned coding units to determine a coding unit of a center location among the coding units. The image decoding apparatus 700 may determine the coding unit 2114b having a PID corresponding to a middle value among the PIDs of the coding units, as the coding unit of the center location among the coding units determined by partitioning the first coding unit 2110. According to an embodiment, the image decoding apparatus 700 may determine PIDs for identifying partitioned coding units, based on a size ratio between the coding units when the partitioned coding units do not have equal sizes. Referring to FIG. 21, the coding unit 2114b generated by partitioning the first coding unit 2110 may have a width equal to that of the other coding units 2114a and 2114c and a height which is two times that of the other coding units 2114a and 2114c. In this case, assuming that the PID of the coding unit 2114b of the center location is 1, the PID of the coding unit 2114c located next to the coding unit 2114b may be increased by 2 and thus may be 3. When the PID is not uniformly increased as described above, the image decoding apparatus 700 may determine that a coding unit is partitioned into a plurality of coding units including a coding unit having a size different from that of the other coding units. According to an embodiment, when the partitioning method information indicates to partition a coding unit into an odd number of coding units, the image decoding apparatus 700 may partition a current coding unit in such a manner that a coding unit of a predetermined location among an odd number of coding units (e.g., a coding unit of a centre location) has a size different from that of the other coding units. In this case, the image decoding apparatus 700, may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 700 may use a predetermined data unit where a coding unit starts to be recursively partitioned.

Figure 22:
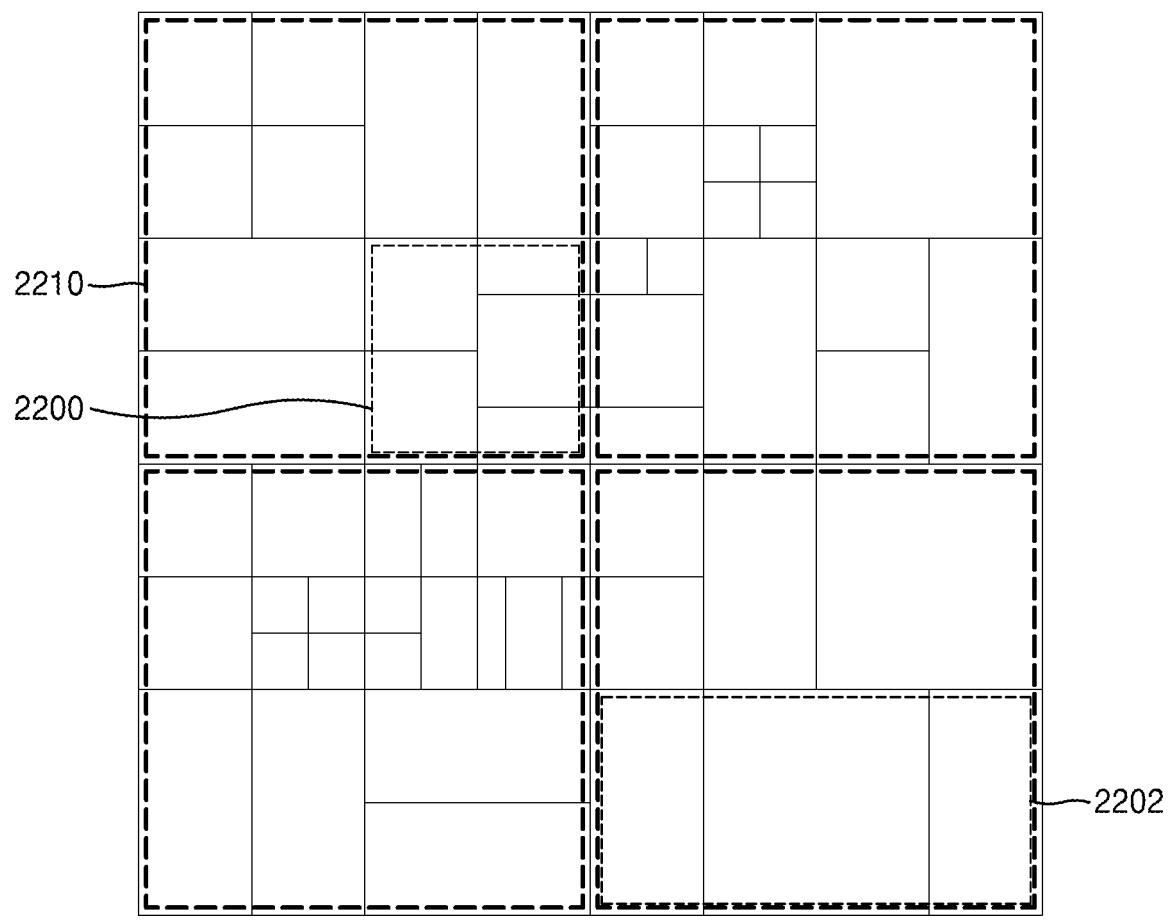
FIG. 22 shows that a plurality of coding units are determined based on a plurality of predetermined data units included in a picture, according to an embodiment.

FIG. 22 shows that a plurality of coding units are determined based on a plurality of predetermined data units included in a picture, according to an embodiment.

According to an embodiment, a predetermined data unit may be defined as a data unit where a coding unit starts to be recursively partitioned using at least one of block shape information and partitioning method information. That is, the predetermined data unit may correspond to a coding unit of an uppermost depth, which is used to determine a plurality of coding units partitioned from a current picture. In the following description, for convenience of explanation, the predetermined data unit is referred to as a reference data unit.

According to an embodiment, the reference data unit may have a predetermined size and shape. According to an embodiment, the reference coding unit may include M×N samples. Herein, M and N may be equal values, and may be integers expressed as multipliers of 2. That is, the reference data unit may have a square or non-square shape, and may be an integer number of coding units.

According to an embodiment, the image decoding apparatus 700 may partition the current picture into a plurality of reference data units. According to an embodiment, the image decoding apparatus 700 may partition the plurality of reference data units, which are partitioned from the current picture, by using partitioning information of each reference data unit. The operation of partitioning the reference data unit may correspond to a partitioning operation using a quadtree structure.

According to an embodiment, the image decoding apparatus 700 may previously determine the minimum size allowed for the reference data units included in the current picture. As such, the image decoding apparatus 700 may determine various reference data units having sizes equal to or greater than the minimum size, and determine one or more coding units by using the block shape information and the partitioning method information with reference to the determined reference data unit.

Referring to FIG. 22, the image decoding apparatus 700 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, and largest coding units).

According to an embodiment, the image decoding apparatus 700 may obtain, from a bitstream, at least one of reference coding unit shape information and reference coding unit size information with respect to each of the various data units. An operation of partitioning the square reference coding unit 2200 into one or more coding units has been described above in relation to the operation of partitioning the current coding unit 1000 of FIG. 10, and an operation of partitioning the non-square reference coding unit 2202 into one or more coding units has been described above in relation to the operation of partitioning the current coding unit 1100 or 1150 of FIG. 11. Thus, detailed descriptions thereof will not be provided herein.

According to an embodiment, the image decoding apparatus 700 may use a PID for identifying the size and shape of reference coding units, to determine the size and shape of reference coding units according to some data units previously determined based on a predetermined condition. That is, image decoding apparatus 700 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, and largest coding units). The image decoding apparatus 700 may determine the size and shape of reference data units with respect to each data unit, which satisfies the predetermined condition, by using the PID. When the reference coding unit shape information and the reference coding unit size information are obtained and used from the bitstream with respect to each data unit having a relatively small size, since efficiency of using the bitstream may not be good, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 700 may determine at least one of the size and shape of reference coding units included in a data unit serving as a unit for obtaining the PID, by selecting the previously determined at least one of the size and shape of reference coding units based on the PID.

According to an embodiment, the image decoding apparatus 700 may use one or more reference coding units included in a largest coding unit. That is, a largest coding unit partitioned from a picture may include one or more reference coding units, and coding units may be determined by recursively partitioning each reference coding unit. According to an embodiment, at least one of a width and height of the largest coding unit may be integer times at least one of the width and height of the reference coding units. According to an embodiment, the size of reference coding units may be obtained by partitioning the largest coding unit n times based on a quadtree structure. That is, the image decoding apparatus 700 may determine the reference coding units by partitioning the largest coding unit n times based on a quadtree structure, and partition the reference coding unit based on at least one of the block shape information and the partitioning method information according to various embodiments.

Figure 23:
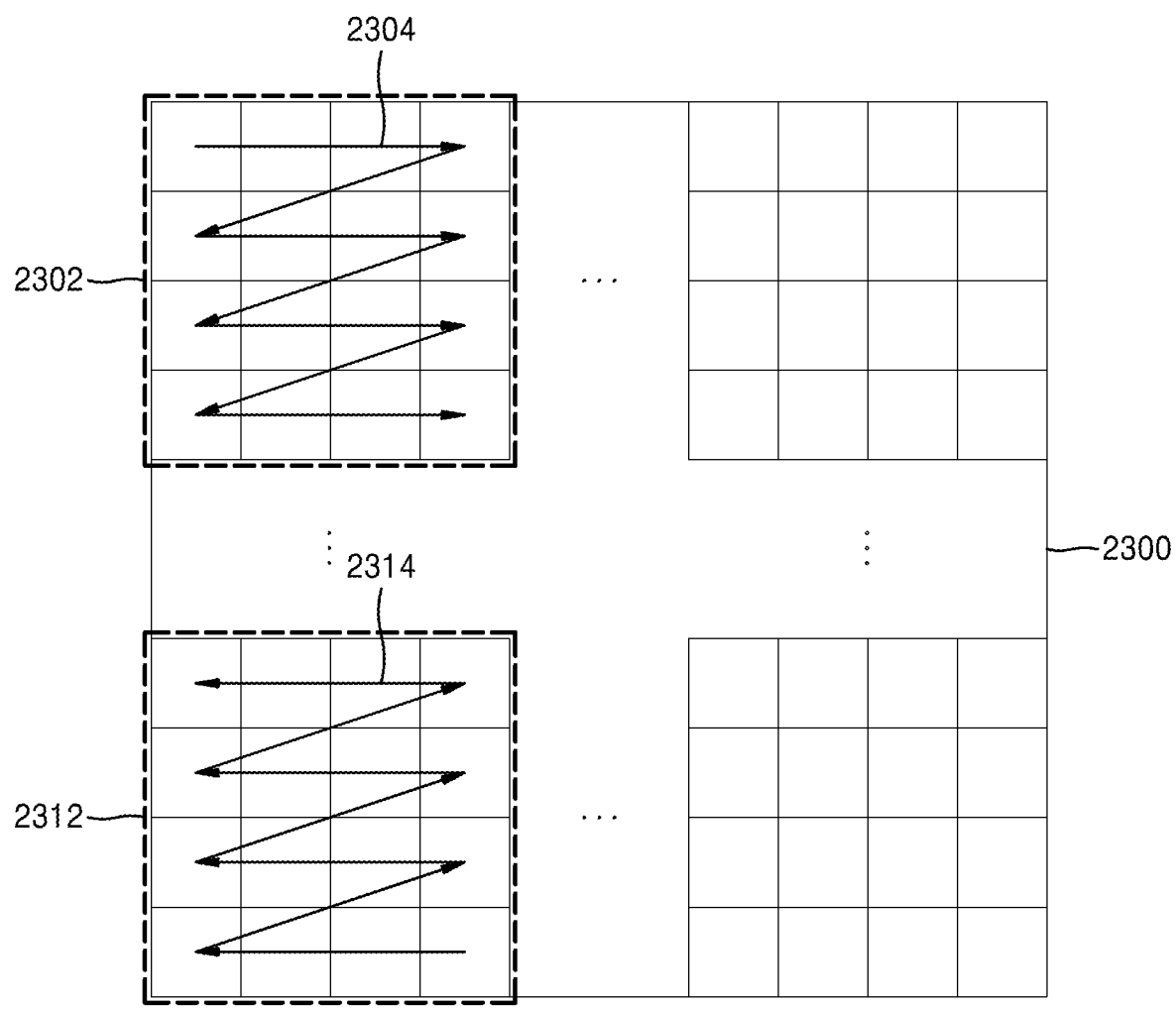
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the image decoding apparatus 700 may determine one or more processing blocks partitioned from a picture. The processing block is a data unit including one or more reference coding units partitioned from a picture, and the one or more reference coding units included in the processing block may be determined in a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 700 may obtain processing block size information and determine the size of one or more processing blocks included in the picture. The image decoding apparatus 700 may obtain the processing block size information from a bitstream and determine the size of one or more processing blocks included in the picture. The size of processing blocks may be a predetermined size of data units, which is indicated by the processing block size information.

According to an embodiment, the image decoding apparatus 700 may obtain the processing block size information from the bitstream with respect to each specific data unit. For example, the processing block size information may be obtained from the bitstream in a data unit such as image, sequence, picture, slice, or slice segment. That is, the image decoding apparatus 700 may obtain the processing block size information from the bitstream with respect to each of the various data units, and determine the size of one or more processing blocks, which are partitioned from the picture, by using the obtained processing block size information. The size of processing blocks may be integer times that of the reference coding units.

According to an embodiment, the image decoding apparatus 700 may determine the size of processing blocks 2302 and 2312 included in the picture 2300. For example, the image decoding apparatus 700 may determine the size of processing blocks based on the processing block size information obtained from the bitstream. Referring to FIG. 23, according to an embodiment, the image decoding apparatus 700 may determine a width of the processing blocks 2302 and 2312 to be four times the width of the reference coding units, and determine a height of the processing blocks 2302 and 2312 to be four times the height of the reference coding units. The image decoding apparatus 700 may determine a determination order of one or more reference coding units in one or more processing blocks.

According to an embodiment, the image decoding apparatus 700 may determine the processing blocks 2302 and 2312, which are included in the picture 2300, based on the size of processing blocks, and determine a determination order of one or more reference coding units in the processing blocks 2302 and 2312. According to an embodiment, determination of reference coding units may include determination of the size of reference coding units.

According to an embodiment, the image decoding apparatus 700 may obtain, from the bitstream, determination order information of one or more reference coding units included in one or more processing blocks, and determine a determination order to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 700 may obtain the determination order information of reference coding units from the bitstream with respect to each specific data unit. For example, the image decoding apparatus 700 may obtain the determination order information of reference coding units from the bitstream with respect to each data unit such as image, sequence, picture, slice, slice segment, or processing block. Since the determination order information of reference coding units indicates an order for determining reference coding units in a processing block, the determination order information may be obtained with respect to each specific data unit including an integer number of processing blocks.

According to an embodiment, the image decoding apparatus 700 may determine one or more reference coding units based on the determined determination order.

According to an embodiment, the image decoding apparatus 700 may obtain the determination order information of reference coding units from the bitstream as information related to the processing blocks 2302 and 2312, and determine a determination order of one or more reference coding units included in the processing blocks 2302 and 2312 and determine one or more reference coding units, which are included in the picture 2300, based on the determination order. Referring to FIG. 23, the image decoding apparatus 700 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included the processing block 2302 may be determined in a raster scan order. Unlike this, when the determination order 2314 of reference coding units in the other processing block 2312 is an inverse raster scan order, reference coding units included in the processing block 2312 may be determined in an inverse raster scan order.

According to an embodiment, the image decoding apparatus 700 may decode the determined one or more reference coding units. The image decoding apparatus 700 may decode the picture based on the reference coding units determined as described above. A method of decoding the reference coding units may include various image decoding methods.

According to an embodiment, the image decoding apparatus 700 may obtain block shape information indicating the shape of a current coding unit or partitioning method information indicating a partitioning method of the current coding unit, from the bitstream, and use the obtained information. The block shape information or the partitioning method information may be included in the bitstream related to various data units. For example, the image decoding apparatus 700 may use the block shape information or the partitioning method information included in a sequence parameter set, a picture parameter set, a video parameter set, a slice header, or a slice segment header. Furthermore, the image decoding apparatus 700 may obtain syntax corresponding to the block shape information or the partitioning method information from the bitstream with respect to each largest coding unit, reference coding unit, or processing block, and use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. An image decoding method comprising:
obtaining, from a bitstream, prediction mode information of a current block to be decoded and filtering information indicating whether to filter a predicted block;
generating a first predicted block of the current block based on the prediction mode information;
generating a second predicted block by changing a pixel value of a current pixel in the first predicted block based on gradient values between the current pixel and adjacent pixels of the current pixel, when the filtering information indicates to filter the first predicted block;
reconstructing a residual corresponding to a difference value between the current block and the second predicted block by extracting the residual from the bitstream; and decoding the current block by adding the residual to the second predicted block, wherein the generating of the second predicted block comprises:

determining weights of the current pixel, an upper pixel located at an upper side of the current pixel, and a left pixel located at a left side of the current pixel, based on a first gradient value indicating a difference value between the current pixel and the upper pixel and a second gradient value indicating a difference value between the current pixel and the left pixel; and changing the pixel value of the current pixel by using the weight of the current pixel, the weight of the upper pixel, and the weight of the left pixel.

2. The image decoding method of claim 1, wherein the generating of the first predicted block comprises generating the first predicted block by performing intra prediction or inter prediction on the current block.

3. The image decoding method of claim 2, wherein the generating of the second predicted block comprises changing a pixel value of a next pixel adjacent to the current pixel, after changing the pixel value of the current pixel, and wherein the pixel value of the next pixel is changed based on gradient values between the next pixel and adjacent pixels of the next pixel.

4. The image decoding method of claim 3, wherein the filtering information comprises information about a number of times that filtering is repeated, and wherein the generating of the second predicted block is repeated by a predetermined number of times based on the information about the number of times that the filtering is repeated.

5. The image decoding method of claim 3, wherein the generating of the second predicted block comprises repeatedly changing pixel values of pixels in the second predicted block until a difference between pixel values of the current pixel before and after being changed converges to be equal to or less than a predetermined threshold value.

6. The image decoding method of claim 1, wherein, when the first predicted block is generated using the intra prediction, the weights of the current pixel, the upper pixel, and the left pixel are determined based on a direction of the intra prediction.

7. The image decoding method of claim 1, wherein the generating of the second predicted block further comprises determining weights of the current pixel, the upper pixel, the left pixel, a right pixel located at a right side of the current pixel, and a lower pixel located at a lower side of the current pixel, based on the first gradient value, the second gradient value, a third gradient value indicating a difference value between the current pixel and the right pixel, and a fourth gradient value indicating a difference value between the current pixel and the lower pixel, and wherein the pixel value of the current pixel is changed based on the weight of the current pixel, the weight of the upper pixel, the weight of the left pixel, the weight of the right pixel, and the weight of the lower pixel.

8. The image decoding method of claim 7, wherein the generating of the second predicted block comprises, assuming that a size of the first predicted block is m×n (where m and n are positive integers), the pixel value of the current pixel located in an $i^{th}$ column and a $j^{th}$ row of the first predicted block is f[i][j], the weight of the current pixel is α, the pixel value of the upper pixel is f[i][j−1], the weight of the upper pixel is β, the pixel value of the left pixel is f[i−1][j], the weight of the left pixel is γ, the pixel value of the right pixel is f[i+1][j], the weight of the right pixel is δ, the pixel value of the lower pixel is f[i][j+1], and the weight of the lower pixel is ε, changing the pixel value of the current pixel into f'[i][j] as shown in $$f'[i][j] = \frac{1}{\alpha+\beta+\gamma+\delta+\varepsilon}(\alpha f[i][j] + \beta f[i][j-1] + \gamma f[i-1][j] + \delta f[i+1][j] + \varepsilon f[i][j+1]).$$

9. The image decoding method of claim 8, wherein the weight δ of the right pixel equals the weight γ of the left pixel, and wherein the weight ε of the lower pixel equals the weight β of the upper pixel.

10. The image decoding method of claim 8, wherein the weight δ of the right pixel and the weight ε of the lower pixel have a value 0.

11. An image decoding apparatus comprising:

an entropy decoder configured to obtain, from a bitstream, prediction mode information of a current block to be decoded and filtering information indicating whether to filter a predicted block;

a predictor configured to generate a first predicted block of the current block based on the prediction mode information;

a post-processor configured to generate a second predicted block by changing a pixel value of a current pixel in the first predicted block based on gradient values between the current pixel and adjacent pixels of the current pixel, when the filtering information indicates to filter the first predicted block;

an inverse transformer and inverse quantizer configured to reconstruct a residual corresponding to a difference value between the current block and the second predicted block by extracting the residual from the bitstream; and an adder configured to decode the current block by adding the residual to the second predicted block, wherein the post-processor is further configured to determine weights of the current pixel, an upper pixel located at an upper side of the current pixel, and a left pixel located at a left side of the current pixel, based on a first gradient value indicating a difference value between the current pixel and the upper pixel and a second gradient value indicating a difference value between the current pixel and the left pixel; and change the pixel value of the current pixel by using the weight of the current pixel, the weight of the upper pixel, and the weight of the left pixel.

12. The image decoding apparatus of claim 11, wherein the predictor is further configured to generate the first predicted block by performing intra prediction or inter prediction on the current block.

13. The image decoding apparatus of claim 12, wherein the post-processor is further configured to change a pixel value of a next pixel adjacent to the current pixel, after changing the pixel value of the current pixel, and wherein the pixel value of the next pixel is changed based on gradient values between the next pixel and adjacent pixels of the next pixel.

14. An image encoding method comprising:

generating a first predicted block of a current block to be encoded;

generating a second predicted block by changing a pixel value of a current pixel in the first predicted block based on gradient values between the current pixel and adjacent pixels of the current pixel; and encoding a difference value between the current block and the second predicted block, wherein the generating of the second predicted block comprises:

determining weights of the current pixel, an upper pixel located at an upper side of the current pixel, and a left pixel located at a left side of the current pixel, based on a first gradient value indicating a difference value between the current pixel and the upper pixel and a second gradient value indicating a difference value between the current pixel and the left pixel; and changing the pixel value of the current pixel by using the weight of the current pixel, the weight of the upper pixel, and the weight of the left pixel.

* * * * *